US012005376B2

(12) United States Patent
Shoykhet et al.

(10) Patent No.: US 12,005,376 B2
(45) Date of Patent: Jun. 11, 2024

(54) TWO-DIMENSIONAL FLUID SEPARATION WITH PUSH-PULL MODULATION

(71) Applicant: Agilent Technologies, Inc., Santa Clara, CA (US)

(72) Inventors: Konstantin Shoykhet, Karlsruhe (DE); Dwight Robert Stoll, Saint Peter, MN (US)

(73) Assignee: Agilent Technologies, Inc., Santa Clara, CA (US)

( * ) Notice: Subject to any disclaimer, the term of this patent is extended or adjusted under 35 U.S.C. 154(b) by 626 days.

(21) Appl. No.: 17/279,354

(22) PCT Filed: Sep. 17, 2019

(86) PCT No.: PCT/IB2019/057816
§ 371 (c)(1),
(2) Date: Mar. 24, 2021

(87) PCT Pub. No.: WO2020/065445
PCT Pub. Date: Apr. 2, 2020

(65) Prior Publication Data
US 2021/0394082 A1    Dec. 23, 2021

Related U.S. Application Data

(60) Provisional application No. 62/736,014, filed on Sep. 25, 2018.

(51) Int. Cl.
*B01D 15/18* (2006.01)
*B01D 15/16* (2006.01)
(Continued)

(52) U.S. Cl.
CPC ....... *B01D 15/1878* (2013.01); *B01D 15/163* (2013.01); *G01N 27/44773* (2013.01);
(Continued)

(58) Field of Classification Search
CPC .............. B01D 15/163; B01D 15/1878; G01N 2030/326; G01N 27/44756;
(Continued)

(56) References Cited

U.S. PATENT DOCUMENTS

| 5,540,562 A | 7/1996 | Giter |
| 2012/0240666 A1 | 9/2012 | Sims |
| 2017/0343520 A1 | 11/2017 | Ortmann et al. |

FOREIGN PATENT DOCUMENTS

| CN | 103575832 A | 2/2014 |
| CN | 103930778 A | 7/2014 |

(Continued)

OTHER PUBLICATIONS

Griffith, James F. et al. "A reversed-flow differential flow modulator for comprehensive two-dimensional gas chromatography" Journal of Chromatography, vol. 1226, Feb. 1, 2012 (Feb. 1, 2012) pp. 116-123.
(Continued)

*Primary Examiner* — Dirk R Bass

(57) ABSTRACT

A sample separation apparatus includes a first-dimension separation unit for separating the fluidic sample, having a first-dimension outlet for outputting the fluidic sample or fractions thereof, and a second-dimension separation unit for further separating the fluidic sample or fractions thereof. The second-dimension separation unit has a second-dimension inlet fluidically coupled to the first-dimension outlet. A modulation unit, coupled between the first-dimension outlet and the second-dimension inlet at a first coupling point, is configured for withdrawing fluid from the first coupling point and for ejecting fluid into the first coupling point. A second-dimension fluid drive is coupled to a second coupling point located between the first-dimension outlet and the second-dimension inlet and downstream from the first coupling point. The second-dimension fluid drive is config-
(Continued)

ured for generating a fluid flow for driving at least part of the fluidic sample after treatment by the first-dimension separation unit through the second-dimension separation unit.

20 Claims, 8 Drawing Sheets

(51) Int. Cl.
    *G01N 27/447*     (2006.01)
    *G01N 30/02*     (2006.01)
    *G01N 30/06*     (2006.01)
    *G01N 30/16*     (2006.01)
    *G01N 30/32*     (2006.01)
    *G01N 30/46*     (2006.01)

(52) U.S. Cl.
    CPC ............. *G01N 30/06* (2013.01); *G01N 30/16* (2013.01); *G01N 30/32* (2013.01); *G01N 30/463* (2013.01); *G01N 2030/326* (2013.01)

(58) Field of Classification Search
    CPC .. G01N 27/44773; G01N 30/06; G01N 30/16; G01N 30/32; G01N 30/463; G01N 30/88
    See application file for complete search history.

(56) References Cited

FOREIGN PATENT DOCUMENTS

| | | |
|---|---|---|
| CN | 104285145 A | 1/2015 |
| EP | 3252463 A1 | 12/2017 |
| WO | 9530089 A1 | 11/1995 |
| WO | 2013167193 A1 | 11/2013 |

OTHER PUBLICATIONS

PCT Notification of Transmittal of The International Search Report and Written Opinion dated Dec. 12, 2019; Application No. PCT/IB2019/057816; 16 pages.

Seeley, John V., et al., "Comprehensive Two-Dimensional Gas Chromatography via Differential Flow Modulation," Anal Chem., Sep. 1, 2000 (Sep. 1, 2000); vol. 72, No. 18, ; pp. 4346-4352.

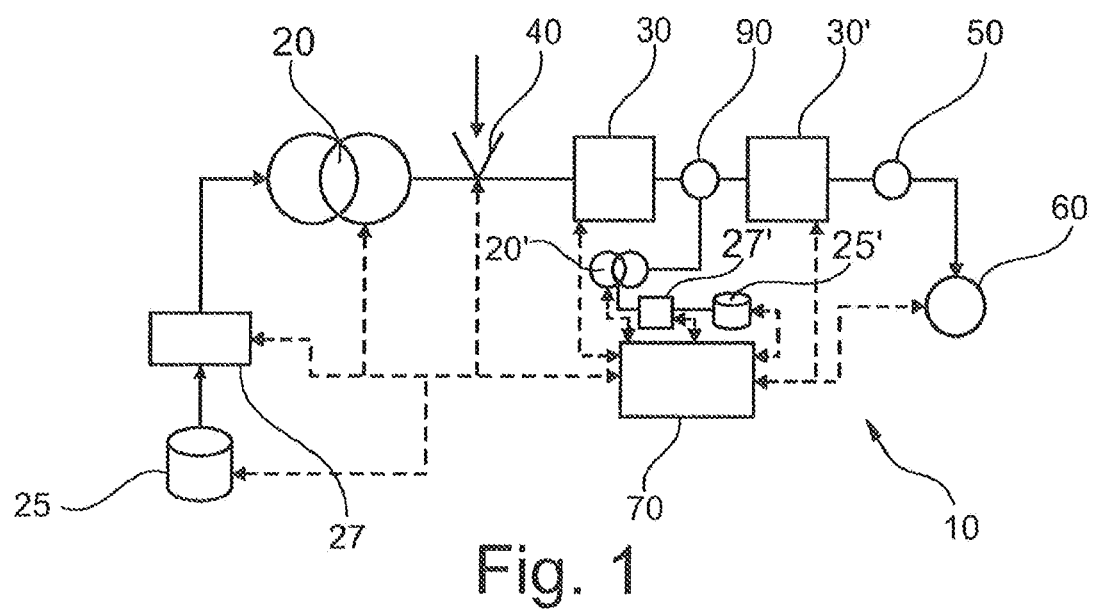
Fig. 1
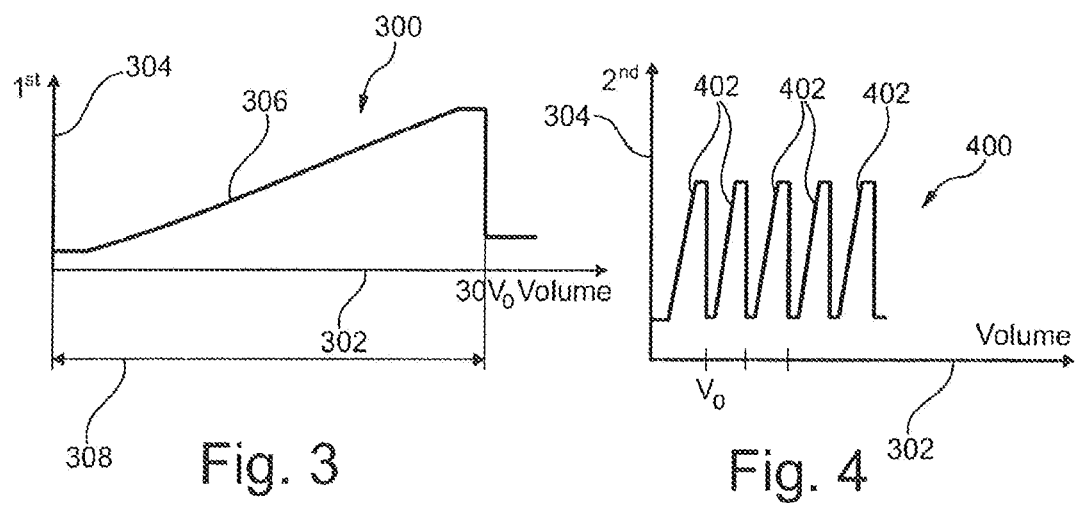
Fig. 3
Fig. 4

TWO-DIMENSIONAL FLUID SEPARATION WITH PUSH-PULL MODULATION

RELATED APPLICATIONS

This application is the national stage under 35 U.S.C. 371 of International Application No. PCT/IB 2019/057816, filed Sep. 17, 2019, which claims priority to U.S. Provisional Patent Application No. 62/736,014, filed Sep. 25, 2018; the entire contents of each of which are incorporated by reference herein.

BACKGROUND ART

The present invention relates to a sample separation system.

In liquid chromatography, a fluidic sample and an eluent (liquid mobile phase) may be pumped through conduits and a column in which separation of sample components takes place. The column may comprise a material which is capable of separating different components of the fluidic analyte. Such a packing material, so-called beads which may comprise silica gel, may be filled into a column tube which may be connected to other elements (like a sampler, a detector) by conduits.

The composition of the mobile phase can be adjusted by composing the mobile phase from different fluidic components with variable contributions, so called gradient mode. HPLC systems often are operated in such a gradient mode, wherein for instance for reversed phase chromatography the organic content is ramped over time, or for ion exchange chromatography the salt content is ramped over time. Especially in peptide or protein analysis most applications are based on water/acetonitrile gradients. An analytical protocol for running a defined analytical process is called the "method". In the analytical protocol—or method—for a gradient separation, the gradient is usually defined as a composition change program over time, while the flow rate may be kept constant. The so-called retention time is a time required for transport of a certain component of a fluidic sample to be separated throughout a separation column during a separation run.

An alternative to the concept of retention times is known as the concept of retention volumes. WO2009062538A1, by the same applicant, discloses in a high-performance liquid chromatography system, wherein a mobile phase is driven through a stationary phase for separating components of a fluidic sample comprised in the mobile phase, a flow rate of the mobile phase may not be constant and may depend on a variation in a control value in the system. WO2009062538A1 comprises determining (for instance by an adequate analysis unit, which considers predicted, measured or elsewise derived flow information) a value of a retention volume representing such volume of the mobile phase required to elute a respective compound of the fluidic sample at least through the separating device. The mobile phase drive is then operated (for instance by an adequate control unit) based on the determined value of the volume delivered into the system. This makes use of the concept of retention volumes, rather than retention times.

Two-dimensional separation of a fluidic sample denotes a separation technique in which a first separation procedure in a first separation unit is performed to separate a fluidic sample into a plurality of fractions, and in which a subsequent second separation procedure in a second separation unit is performed to further separate at least one of the plurality of fractions into sub-fractions. Two-dimensional liquid chromatography (2D LC) may combine two liquid chromatography separation techniques and plot the time dependency of detection events along two orthogonal time axes.

US2017343520A1, by the same applicant, discloses a two-dimensional separation unit having a flow adjustment unit. Separated fractions from the first dimension can be temporarily stored in the flow adjustment unit and later be injected into the second dimension.

In most such conventional two-dimensional separation systems, the first dimension and the second dimension are not directly fluidically coupled with each other in the sense of a direct fluidic communication e.g. by providing a direct flow from the first-dimension outlet to the second-dimension inlet, but discrete fluid portions are transferred, e.g. from the first-dimension outlet to the second-dimension inlet, for example by means of one or more valves. Accordingly, the effluent from the first dimension is substantially at ambient pressure and needs to be pressurized before injection into the second dimension and/or will be pressurized during injection into the second dimension.

In a so-called tandem-LC system for two-dimensional separation, the second-dimension separation unit is arranged downstream of the first-dimension separation unit. The first dimension and the second dimension are directly fluidically coupled with each other by having a direct flow from a first-dimension outlet to a second-dimension inlet, i.e. no valve or other tool is required for disrupting the fluidic connection between the first and the second dimension or for maintaining the outlet of the first dimension at a pressure substantially lower than the inlet pressure of the second dimension. Resulting from the direct fluidic coupling in such tandem-LC systems, the first-dimension outlet is substantially at the same pressure level as the second-dimension input. In other words, so that the effluent from the first dimension (at the first-dimension outlet) is substantially at the same pressure level as the second-dimension input. In other words, the direct fluidic coupling between the first-dimension inlet and the second-dimension outlet in such tandem-LC systems allows that any sample effluent from the first dimension can stay at substantially the same pressure level and does not have to be expanded and/or compressed before introduction into the second dimension, so that no (additional) pressurization is required or will occur during sample introduction into the second dimension.

WO2012175111A1, by the same applicant, discloses such tandem-LC as a two-dimensional separation, wherein the second-dimension separation unit is arranged downstream of the first-dimension separation unit. A fluidic valve has fluidic interfaces coupled to a fluid drive of the first dimension and a fluid drive of the second dimension and is switchable for performing the separation of the fluidic sample.

WO2013167193A1, by the same applicant, discloses a tandem-LC wherein the two-dimensional separation is pressure-controlled at a predefined position in the fluidic path between an outlet of the first-dimension separation and an inlet of the second-dimension separation.

SUMMARY

It is an object of the invention to provide an improved two-dimensional tandem-LC separation.

A preferred embodiment provides a sample separation apparatus for separating a fluidic sample. The sample separation apparatus comprises a first-dimension separation unit for separating the fluidic sample, wherein the first-dimension separation unit has a first-dimension outlet for outputting the fluidic sample or fractions thereof after treatment by the first-dimension separation unit. A second-dimension separation unit is provided for further separating the fluidic sample or fractions thereof after treatment by the first-dimension separation unit, wherein the second-dimension separation unit has a second-dimension inlet being fluidically coupled to the first-dimension output of the first-dimension separation unit. A modulation unit is fluidically coupled between the first-dimension outlet and the second-dimension inlet at a first coupling point, wherein the modulation unit is configured for withdrawing fluid from the first coupling point and for ejecting fluid into the first coupling point. A second-dimension fluid drive is fluidically coupled to a second coupling point between the first-dimension output and the second-dimension input, wherein the second coupling point is located downstream from the first coupling point, and the second-dimension fluid drive is configured for generating a fluid flow for driving at least part of the fluidic sample after treatment by the first-dimension separation unit through the second-dimension separation unit.

In contrast to the tandem-LC set up as disclosed in the aforementioned WO2013167193A1, embodiments of the present invention can be provided without valve or other switching unit between the first-dimension outlet and the second-dimension inlet. The fluidic coupling (e.g. provided by one or more conduits) from the first-dimension outlet to the second-dimension inlet provides two coupling points (allowing fluidic side connections). Similar to the functionality of the fluidic valve in the aforementioned WO2013167193A1, the second coupling point allows fluidic coupling of the second-dimension fluid drive, which may provide a diluent and/or a gradient for the second-dimension separation provided by the second-dimension separation unit. The first coupling point, however, allows coupling of the modulation unit (which may be modulation pump, modulation syringe or similar). The modulation unit is configured for alternatingly withdrawing—in a withdrawing phase—effluent (as provided from the first-dimension separation unit via the first-dimension output) from the first coupling point and storing such withdrawn effluent within the modulation unit, and ejecting—in an ejection phase—the stored effluent into the first coupling point.

An embodiment according to the present invention comprises a method for separating a fluidic sample. The method comprises: separating—in a first dimension—the fluidic sample and outputting the fluidic sample or fractions thereof after treatment by the first dimension; fluidically coupling at a first coupling point downstream from the first-dimension separating for one of: withdrawing fluid from the first coupling point during a withdrawing phase, and ejecting fluid into the first coupling point during an ejection phase; and generating a fluid flow into a second coupling point, downstream from the first coupling point, for further separating—in a second dimension—the fluidic sample or fractions thereof after treatment by the first dimension.

In preferred embodiment, the method comprises, during the withdrawing phase, withdrawing from the first coupling point at least such amount of fluid as received from the first-dimension outlet (i.e. the fluidic sample or fractions thereof after treatment by the first-dimension separation unit as outlet at the first-dimension outlet)

In preferred embodiment, the method comprises, during the withdrawing phase, withdrawing from the first coupling point an amount of the fluid coupled (by the second-dimension fluid drive) into the second coupling point, along with the amount of fluid received from the first-dimension outlet.

In preferred embodiment, the method comprises, during the ejection phase, ejecting into the first coupling point at least a part of the fluid withdrawn during the withdrawing phase from the first coupling point.

In preferred embodiment, the method comprises, during the ejection phase, ejecting into the first coupling point an additional amount of fluid for at least one of diluting the fluid previously withdrawn from the first coupling point and purging any fluid previously withdrawn from the first coupling point. This may allow reducing sample carryover.

Operation of the modulation unit is preferably provided so that—during the withdrawing phase—no effluent from the first dimension but only mobile phase (e.g. gradient) as provided by the second-dimension fluid drive reaches the second-dimension separation unit.

Operation of the modulation unit is preferably provided so that—during the ejection phase—the stored effluent being ejected (from the modulation unit) adds to (additional) effluent from the first-dimension as (typically continuously) provided at the first-dimension outlet, so that the sample aliquot as provided from the first coupling point (towards the second dimension) consists of stored sample volume (previously withdrawn by the modulation unit) and the effluent volume at the first-dimension outlet (flowed during the ejection phase).

The term "aliquot" or "sample aliquot" as used herein can be understood as a portion of a fluid (e.g. a fluidic sample), preferably a portion of an effluent of the first dimension which is (or will be) subjected as a whole (i.e. preferably comprising its entire volume) to separation (typically in a second dimension) into one or more fractions thereof.

During the ejection phase, the second-dimension fluid drive is preferably configured to deliver additional flow to provide a total flow into the second dimension (i.e. at the second-dimension inlet) at a desired value, e.g. to a flow rate as used during a second-dimension separation or to a flow rate needed to keep a pressure at the second-dimension inlet substantially constant. A solvent modulation ratio (or dilution ratio) is determined by the relation (such as proportion or ratio) of the sum of ejection flow (from the modulation unit) plus the first-dimension flow at the first-dimension outlet to the flow as provided by the second-dimension fluid drive (during the ejection phase).

In a preferred embodiment of the sample separation apparatus, the fluidic coupling of the second-dimension inlet to the first-dimension outlet is at least one of: a permanent fluidic coupling, a direct fluidic communication e.g. not comprising an active valve, a passive fluidic communication, a fluidic conduit, a fluidic connection enabling essentially unconstrained liquid flow at least in the direction from the first-dimension outlet towards or to the second-dimension inlet, and a fluidic connection enabling essentially the same pressure (of the fluid) in the fluid flow path between the first-dimension outlet and the second-dimension inlet. Such (direct) fluidic coupling allows maintaining the sample aliquot coming from the first dimension at substantially the same pressure level as the second-dimension inlet, so that preferably no pressurization or re-pressurization of the sample aliquot is required before introduction into the second dimension.

In a preferred embodiment, the modulation unit is configured for withdrawing—during the withdrawing phase—from the first coupling point at least such amount of fluid as received from the first-dimension outlet (i.e. a volume of the fluidic sample or fractions thereof after treatment by the first-dimension separation unit as outlet at the first-dimension outlet), and preferably for withdrawing further an amount of the fluid provided into the second coupling point by the second-dimension fluid drive.

In a preferred embodiment, the modulation unit is configured for ejecting (at a point in time later relative to the withdrawal) into the first coupling point at least a part of the fluid withdrawn from the first coupling point, and preferably for ejecting further an additional amount of fluid additionally received by the modulation unit.

In a preferred embodiment, the modulation unit comprises a fluid reservoir configured for (e.g. temporarily) storing a fluid volume. The modulation unit is preferably configured to eject an amount (which may be the entire stored fluid volume or a portion thereof) of the fluid volume stored in the fluid reservoir into the first coupling point, preferably an amount of such fluid previously withdrawn from the first coupling point.

In a preferred embodiment, the modulation unit comprises a pump. The pump may comprise one or more of the following: a syringe pump, a piston pump, preferably a reciprocating pump, a dual pump comprising two (preferably reciprocating) piston pumps connected in parallel or in series to each other, a multi-stage step-piston pump having a single piston with at least two sections having different diameters, and a modulation pump being capable of intaking and ejecting at least a limited amount of fluid via the same connection port/conduit.

In a preferred embodiment, the modulation unit comprises a pump and a fluid reservoir. The fluid reservoir is coupled between the pump and the first coupling point, and the fluid reservoir is configured for storing an amount of fluid as withdrawn by the pump from the first coupling point.

In a preferred embodiment, the fluid reservoir comprises a sample loop configured for storing a fluid volume. A sample loop can be understood here e.g. as a tube or capillary with internal volume sufficient to accommodate the desired amount of sample. In preferred embodiments, the sample loop capillary is curved, coiled or otherwise deviant from straight shape.

A preferred embodiment further comprises a first-dimension fluid drive configured for generating a fluid flow for driving the fluidic sample to be separated through the first-dimension separation unit.

In a preferred embodiment, the first coupling point comprises the second coupling point. In such embodiment of the flow path between the first-dimension outlet and the second-dimension inlet, the first coupling point and the second coupling point are substantially physically overlapping. The first coupling point is configured such that the entire flow from the first-dimension output is withdrawn by and into the modulation unit, when the modulation unit is withdrawing at the same or higher flow rate than a delivery rate from the first-dimension output, so that no portion of such flow from the first-dimension output can bypass the "suction point" and continue movement towards the second-dimension. The embodiment is configured so that no flow line is existent for the second-dimension flow (outcoming from the second coupling point), which would lead to the first coupling point, unless the withdraw flow rate is greater than the first-dimension flow rate. In such embodiment, no portion of the second-dimension flow provided via the second coupling point may get sucked by the modulation pump via the first coupling point, unless the draw flow rate is greater than first-dimension flow rate. The embodiment comprises a crossing representing a junction comprising the first coupling point and the second coupling point and having a boundary surface which completely separates flow from the first-dimension outlet and the second-dimension inlet. Such boundary surface may be understood as an uninterrupted non-material surface in space.

Preferably, the crossing is not permeated by any flow line towards the second-dimension inlet when the modulation unit is drawing at the same or higher flow rate as the delivery rate of the first dimension (i.e. a boundary surface spanning over the entire cross-section of the fluidic channel exists, such that the second-dimension inlet and the second coupling point are separated by the boundary surface from the first-dimension outlet and the first coupling point, whereas at any point of the boundary surface the normal flow rate is zero or directed towards the first coupling point).

It has to be noted that certain retention properties, such as retention time and/or retention volume, of certain compounds (such as ionic substances) may depend on the absolute pressure level within a separation unit such as a chromatographic column (i.e. not only on a pressure difference e.g. between inlet and outlet of such separation unit but also on the pressure value at the outlet thereof). In tandem-LC system according to embodiments of the present invention, the pressure at the first-dimension outlet is substantially the same as the pressure at the second-dimension inlet and may be in the range of 30 to 2000 bar, particularly 100 to 1500 bar, mare particularly 400 to 1000 bar. Accordingly, such retention properties in the first dimension of a tandem-LC system according to embodiments of the present invention may differ from retention properties in a one-dimensional separation (wherein the pressure at the outlet of the separation unit is substantially at ambient pressure). This should be considered in particular in method development, i.e. for developing a method for carrying out a chromatographic separation of a specific sample. When using a one-dimensional separation unit for method development, a restriction, external pressure source, or similar may be applied to the output of such one-dimensional separation unit in order to set the pressure at such output at a pressure level corresponding to a pressure level in a (tandem-LC) sample separation apparatus according to embodiments of the present invention.

According to an embodiment, the sample separation apparatus is configured for adjusting a pressure at a predefined position to a predefined value, wherein the predefined position is preferably in a fluidic path between the first-dimension outlet (of the first-dimension separation unit) and the second-dimension inlet (of the second-dimension separation unit) or in (particularly direct, i.e. without a fluidic impedance in between) fluid communication with this fluidic path. The two separation units are in direct fluid connection to one another. The fluidic sample may first be transported through or treated by the first-dimension separation unit before at least part of the same fluidic sample is transported through or treated by the second-dimension separation unit.

In preferred embodiment, the predefined position is in one of the following: a section between the first-dimension output and the first coupling point, a section between the first coupling point and the second coupling point, and a section between the second coupling point and the second-dimension input.

According to still another exemplary embodiment of the present invention, a software program or product is provided, preferably stored on a data carrier, for controlling or executing the method having the above-mentioned features, when run on a data processing system such as a computer. Thus, an embodiment of the present disclosure encompasses a non-transitory computer-readable medium with instructions stored thereon, that when executed by a processor, control the steps of the method according to any of the embodiments disclosed herein.

Embodiments of the invention can be partly or entirely embodied or supported by one or more suitable software programs (or software), which can be stored on or otherwise provided by any kind of non-transitory medium or data carrier, and which might be executed in or by any suitable data processing unit such as an electronic processor-based computing device (or system controller, control unit, etc.) that includes one or more electronic processors and memories. For example, one embodiment of the present disclosure provides a non-transitory computer-readable medium that includes instructions stored thereon, such that when executed on a processor, the instructions perform the steps of the method of any of the embodiments disclosed herein. Software programs or routines (e.g., computer-executable or machine-executable instructions or code) can be preferably applied in the context of fluid separation control. The fluid separation control scheme according to an embodiment of the invention can be performed or assisted by a computer program, i.e. by software, or by using one or more special electronic optimization circuits, i.e. in hardware, or in hybrid form, i.e. by means of software components and hardware components.

In the context of this application, the term "fluidic sample" may particularly denote any liquid and/or gaseous medium, optionally including also solid particles, which is to be analyzed. Such a fluidic sample may comprise a plurality of fractions of molecules or particles which shall be separated, for instance biomolecules such as proteins. Since separation of a fluidic sample into fractions involves a certain separation criterion (such as mass, volume, chemical properties, etc.) according to which a separation is carried out, each separated fraction may be further separated by another separation criterion (such as mass, volume, chemical properties, etc.) or finer separated by the first separation criterion, thereby splitting up or separating a separate fraction into a plurality of sub-fractions.

In the context of this application, the term "fraction" may particularly denote such a group of molecules or particles of a fluidic sample which have a certain property (such as mass, charge, volume, chemical properties or interaction, etc.) in common according to which the separation has been carried out. However, molecules or particles relating to one fraction can still have some degree of heterogeneity, i.e. can be further separated in accordance with another separation criterion. As well the term "fraction" may denote a portion of a solvent containing the aforementioned group of molecules.

In the context of this application, the term "sub-fractions" may particularly denote individual groups of molecules or particles all relating to a certain fraction which still differ from one another regarding a certain property (such as mass, volume, chemical properties, etc.). Hence, applying another separation criterion for the second separation as compared to the separation criterion for the first separation allows these groups to be further separated from one another by applying the other separation criterion, thereby obtaining the further separated sub-fractions. As well the term "sub-fraction" may denote a portion of a solvent containing the aforementioned individual group of molecules.

In the context of this application, the term "downstream" may particularly denote that a fluidic member located downstream compared to another fluidic member will only be brought in interaction with a fluidic sample after interaction with the other fluidic member (hence being arranged upstream). Therefore, the terms "downstream" and "upstream" relate to a flowing direction of the fluidic sample. The terms "downstream" and "upstream" may also relate to a preferred direction of the fluid flow between the two members being in downstream-upstream relation.

In the context of this application, the term "sample separation apparatus" may particularly denote any apparatus which is capable of separating different fractions of a fluidic sample by applying a certain separation technique. Particularly, two separation units may be provided in such a sample separation apparatus when being configured for a two-dimensional separation. This means that the sample is first separated in accordance with a first separation criterion, and at least one or some of the fractions resulting from the first separation are subsequently separated in accordance with a second, different, separation criterion ore more finely separated in accordance with the first separation criterion.

The term "separation unit" may particularly denote a fluidic member through which a fluidic sample is transferred, and which is configured so that, upon conducting the fluidic sample through the separation unit, the fluidic sample will be separated into different groups of molecules or particles (called fractions or sub-fractions, respectively). An example for a separation unit is a liquid chromatography column which is capable of trapping or retarding and selectively releasing different fractions of the fluidic sample.

In the context of this application, the term "fluid drive" may particularly denote any kind of pump which is configured for conducting a mobile phase and/or a fluidic sample along a fluidic path. A corresponding liquid supply system may be configured for delivery of a single liquid or of two or more liquids in controlled proportions and for supplying a resultant mixture as a mobile phase. It is possible to provide a plurality of solvent supply lines, each fluidically connected with a respective reservoir containing a respective liquid, a proportioning valve interposed between the solvent supply lines and the inlet of the fluid drive, the proportioning valve configured for modulating solvent composition by sequentially coupling selected ones of the solvent supply lines with the inlet of the fluid drive, wherein the fluid drive is configured for taking in liquids from the selected solvent supply lines and for supplying a mixture of the liquids at its outlet. More particularly, the first fluid drive can be configured to conduct the fluidic sample, usually mixed with, or injected into a flow of a mobile phase (solvent composition), through the first-dimension separation unit, whereas the second fluid drive can be configured for conducting the fluidic sample fractions, usually mixed with a further mobile phase (solvent composition), after treatment by the first-dimension separation unit through the second-dimension separation unit.

In the context of this application, the term "flow coupler" or "coupling point" may particularly denote a fluidic component which is capable of unifying flow components from two fluid inlet terminals into one common fluid outlet terminal. For example, a bifurcated flow path may be provided in which two streams of fluids flowing towards a bifurcation point are unified to flow together through the fluid outlet terminal. At a bifurcation point where the fluid inlet terminals and the fluid outlet terminal are fluidically connected, fluid may flow from any source terminal to any destination terminal depending on actual pressure conditions, thereby allowing for some sort of equilibration. The flow coupler may act as a flow combiner for combining flow streams from the two fluid inlet terminals further flowing to the fluid outlet terminal. The flow coupler may provide for a permanent (or for a selective) fluid communication between the respective fluid terminals and connected conduits, thereby allowing for a pressure equilibration between these conduits. In certain embodiments, the flow coupler may also act as a flow splitter.

In the context of this application, the term "fluidic valve" may particularly denote a fluidic component which has fluidic interfaces, wherein upon switching the fluidic valve selective ones of the fluidic interfaces may be selectively coupled to one another so as to allow fluid to flow along a corresponding fluidic path, or may be decoupled from one another, thereby disabling fluid communication.

According to an exemplary embodiment of the invention, a two-dimensional sample separation system is provided which operates with a controlled (particularly constant or essentially constant over time) pressure in a fluidic system segment, between two separation units. Particularly, by maintaining the pressure constant at at least one position in such a segment, preferably over the entire segment, it is possible to operate one or both of the separation units at a predefined pressure value. It should be kept in mind that, due to steep gradients which may be employed in comprehensive 2D-LC, there may be a very frequent and rapid change in viscosity, which is a systematic and otherwise unavoidable pressure dynamics which can be suppressed or even eliminated by embodiments of the invention. Thus, the mechanical stress acting on the separation units can be predicted, is reproducible and may even be kept constant so that the lifetime over which the separation unit(s) may be operated within the sample separation system without maintenance or change may be significantly increased.

Embodiments of the invention are based on the consideration that in contrast to conventional approaches it is not a strict requirement to keep the flow rate through the fluid supply units and the separation units constant over the sample separation procedure. In contrast to this, exemplary embodiments of the invention allow to vary this flow rate, but to consider the pressure along the sample separation path as the controllable parameter which can be set to a predefined or even constant value. A corresponding sample separation control scheme is applied by embodiments of the present invention to a two-dimensional sample separation architecture in which the fluidic sample is firstly separated into fractions by applying a first separation criterion, and subsequently each separated fraction may be further separated into sub-fractions by applying a different second separation criterion.

In the following, further exemplary embodiments of the sample separation system will be explained. However, these embodiments also apply to the method, and the software program or product or non-transitory computer-readable medium.

In an embodiment, the sample separation apparatus is configured for adjusting the pressure at the position to a constant value, i.e. to a target pressure value which is maintained constant over time. Therefore, a control device or the like may control the pressure at the position, more preferably in the entire fluidic path between the two separation units (optionally also including the separation units themselves) towards a constant value which does not change over time. The first-dimension column will see a stable pressure level at its end. So, the first-dimension separation is undisturbed. But also, the internal pressure forces, although at a high level, will stay constant (less dynamic). The second-dimension column will see a stable pressure at its inlet, so the internal pressure forces, although gradually reducing to its end, will stay constant (less dynamic). By preventing sudden pressure pulses or pressure shock on fluidic components such as the separation column(s) it is possible to decrease deterioration or damage of the fluidic components at a corresponding position or in a corresponding segment of a fluidic system.

In an embodiment, the second fluid drive is controllable for adjusting the pressure at the position to the predefined (particularly constant) value. In this embodiment, the control of the second fluid supply unit, i.e. the pump providing the fluid flow to the second-dimension separation unit only, may be configured so that the criterion of maintaining the predefined pressure at least at the position or over a segment is fulfilled.

In an embodiment, the second fluid drive is controllable for adjusting the pressure at the position to follow a predefined course. Such a predefined course may be any desired function, relation or other course defined by a parameter set and defines a trace over time that the pressure is required to precisely follow. The pressure may be adjusted at the predefined position by controlling the flow rate of the second fluid drive.

In an embodiment, the second fluid drive is controllable for adjusting a flow rate at the position to a previously calibrated value. Thus, not only the pressure may be a controlled parameter, it is also possible that the flow rate is set to a defined value or to follow a predefined time-dependency resulting in that the pressure follows a predicted or projected trajectory, particularly in that the pressure remains constant.

In an embodiment, at least one of the modulation unit, the first fluid drive, and the second fluid drive is controllable for adjusting a ratio between a flow rate at the position and a flow rate generated by the first fluid drive to a predefined value, particularly to a constant value, more particularly to follow a predefined course, whereas the first fluid drive is the drive providing the flow to the first (upstream) separation unit. This may then allow to keep the dilution of the mobile phase at the fluid junction reproducible (particularly constant) even in case of a variation of the restriction values of the parts or components of the fluidic system.

In an embodiment, the pressure may be adjusted at the predefined position even when a composition of the mobile phase is commanded by a gradient program of the second fluid drive, which will change the viscosity of the fluid flowing through the second-dimension separation unit. Thus, the control logic may predict and/or consider such an effect and may compensate it. Prediction may be supported by stored information about solvent properties and the resulting viscosity based on composition of the mobile phase. Alternatively, the prediction may result from recording the observed values in a scouting run. The said consideration of the effect by the control logic may occur in real time and be carried out by a regulator engine or unit.

In an embodiment, a flow rate through the second fluid drive is controllable for adjusting the pressure at the position to the predefined value. The flow rate may be the fluid volume (e.g. referred to as a fluid volume under specified conditions, e.g. standard conditions like 25° C. and 1 bar) conveyed by the second fluid drive per time interval.

In an embodiment, the sample separation apparatus is configured for regulating the pressure at the position to the predefined value based on a sensor value indicative of an actual pressure value at the position. For this purpose, at least one pressure sensor or pressure determination unit may be located at the position in the fluidic path between the sample separation units in a fluidic connection to such a position for sensing the actual pressure value. Therefore, a feedback control loop may be implemented to measure the pressure value either at the desired position or at a position in fluid communication with this position so as to derive the actual value of the pressure at this position. Hence, in case the sensor value indicates that the actual or real pressure deviates from a predefined target value, the sample separation apparatus or components thereof (particularly the second fluid supply unit) can be controlled differently so as to cause an adjustment of the pressure at the position from the actual value to the actual target value. Such a sensor may be a pressure sensor, a flow sensor, a temperature sensor, a density sensor, a deflection sensor or any other kind of sensor capable of deriving pressure information. The said sensor as pressure sensor can preferably be also a regular part of the second fluid drive.

In an embodiment, the sample separation apparatus is configured for separating the fluidic sample in accordance with a volume-based control scheme which is executed by controlling run volumes of fluid flowing over at least one of the separation units, whereas evaluation of the sample separation is performed in terms of retention volumes required for releasing fractions of the fluidic sample from at least one of the separation units. Hence, operation may be based on a control of retention volumes (rather than of retention times), in one of or particularly in both dimensions of the sample separation scheme. This may include determining (for instance by an adequate analysis unit, which considers predicted, measured or elsewise derived flow information) a value of a respective delivered volume representing such volume of the mobile phase that has been delivered into or through a separation unit since a separation start, run start or any other reference point in course of analysis. In such a preferred embodiment, the two-dimensional sample separation apparatus (or at least one separation dimension comprising a corresponding fluid drive and sample separation unit as well as data processing and representation) is operated in accordance with a volume-based control scheme. Unlike conventional approaches, such an embodiment does not require the flow rate to be necessarily kept constant and does not rely on the retention time as an axis of a separation progress, but in contrast to this records or registers release of fractions and subfractions of a fluidic sample from a separation column in terms of a volume of a mobile phase needed to release the fraction of the fluidic sample from the respective separating unit. Applying a volume-based operation mode makes it possible to operate the system with a constant pressure at one or both of the separation units, thereby protecting those from mechanical stress caused by strong pressure variations.

In an embodiment, the sample separation apparatus is configured for separating the fluidic sample by modifying a flow rate through at least one of the first fluid drive and the second fluid drive. By taking this approach, the pressure may be kept constant at a position or even over at least a sub-segment of the fluidic path between first-dimension outlet of the first separating unit and second-dimension inlet of the second separating unit, which protects one or more fluidic devices located along this path.

When the sample separation system is a liquid chromatography system such as a HPLC, the first-dimension separation unit and/or the second-dimension separation unit may be a liquid chromatography column.

In a preferred embodiment, at least one of the first-dimension separation and the sequence of second-dimension separations relates to a chromatographic gradient run.

In a preferred embodiment, at least one of the first-dimension separation and the sequence of second-dimension separations relates to an isocratic chromatographic run.

In a preferred embodiment, the first-dimension separation unit and the second-dimension separation unit are configured so as to execute the respective sample separation in accordance with different separation criteria, particularly in accordance with at least partially but not completely orthogonal separation criteria or in accordance with completely orthogonal separation criteria, more particularly having different selectivity patterns to the relevant sample components.

In a preferred embodiment, the first-dimension separation unit and the second-dimension separation unit are configured so as to execute the respective sample separation on identical separation media but with different operating conditions, particularly at least one of the group consisting of different solvents, different steepness of elution gradients, different separation unit temperatures, and different pressures, so that the separation criteria are partially but not completely orthogonal.

In a preferred embodiment, a detector unit it is arranged downstream of the first-dimension separation unit and upstream of the second-dimension separation unit.

In a preferred embodiment, a sample treatment unit is configured for additionally treating the fluidic sample after treatment by the first-dimension separation unit and before being delivered into the second-dimension separation unit, particularly by at least one of the group consisting of addition of chemical reagents, chemical modification, chemical derivatization, reaction detection, catalytic transformation, irradiation, and heating.

In an embodiment, at least one of the first fluid drive and the second fluid drive may be a gradient fluid pump. The term "gradient fluid pump" may particularly relate to a configuration in which the fluid pump pumps a corresponding mobile phase generated by mixing two or more components to provide a desired, composition, optionally variable over time. Also, a combination of multiple isocratic pumps may be used to form the compositional gradient. In still another embodiment one or both of the fluid drives may be an isocratic pump, i.e. only capable of delivery of constant solvent composition.

In an embodiment, the sample separation apparatus comprises a detector for detecting components of the separated fluidic sample and being arranged in the fluid outlet terminal downstream of the second-dimension separation unit. Thus, a detector for detecting the individual fractions and subfractions may be arranged downstream of the second separating unit. Such a detector may operate on the basis of an electromagnetic radiation detection principle. For example, an electromagnetic radiation source may be provided which irradiates the sample passing through a flow cell with primary electromagnetic radiation (such as optical light or ultraviolet light). In response to this irradiation with primary electromagnetic radiation, there will be an interaction of this electromagnetic radiation with the fluidic sample so that this interaction can be detected based on variations in properties of the primary radiation (such as intensity, frequency, spectral distribution, propagation direction, vector of polarization or alike) or based on eventually emerging resulting secondary electromagnetic radiation, the said interaction being indicative of the concentration and kind of sample components contained in the fluidic fractions. Also, other types of detectors are applicable, as e.g. but not limited to mass spectrometric detectors.

In an embodiment, the sample separation apparatus comprises a sample injector for introduction of the fluidic sample into the separation system upstream of the first-dimension separation unit. In such a sample injector, an injection needle may intake a metered amount of fluidic sample into a connected loop. After driving and inserting such an injection needle in a corresponding seat and upon switching a fluid injection valve, the fluidic sample may be injected into the path between first fluid drive and first separating unit. Upon such a switching operation, a mobile phase provided with a desired solvent composition and driven by the fluid drive transports the sample to the separation unit and may get partially mixed with the fluidic sample.

In an embodiment, the first-dimension fluid drive is operable with a first flow rate (pumped fluid volume per time interval) being smaller than a second flow rate (pumped fluid volume per time interval) according to which the second-dimension fluid drive is operable. Due to the two-dimensional separation procedure, the amount of solvent per time interval pumped by the first-dimension fluid drive may be significantly smaller than another solvent composition pumped by the second-dimension fluid drive. This is a natural result in comprehensive 2D-LC simply because the second-dimension separation basically is sampling the first-dimension fractions, whereas all fractions, i.e. the entire effluent volume of the first dimension will be treated as samples for the second dimension. Because it is typically reasonable or necessary to execute the elution from the second separation unit with a mobile phase volume comparable with the sample volume, the total volume of the mobile phase per time will be greater than the total sample volume per time, i.e. the flow rate in the second dimension will exceed or even significantly exceed the flow rate in the first dimension. Also, a pressure (for instance a pressure value in a range between 50 bar and 400 bar, for instance 200 bar) applied across the first-dimension separation unit may be smaller than a pressure (for instance a pressure value in a range between 500 bar and 1500 bar, for instance 800 bar) applied by the second fluid drive across the second-dimension separation unit.

In an embodiment, the second-dimension flow rate is at least five times, particularly is at least ten times, more particularly is at least fifty times, of the first-dimension flow rate. For example, a flow rate of the second-dimension fluid drive may be in a range between about 1 ml/min and about 10 ml/min, whereas a flow rate of the first-dimension fluid drive may be in a range between about 10 µl/min and about 500 µl/min.

In a preferred embodiment, a withdraw flow rate of the modulation unit is at least as high as a flow rate at the first-dimension outlet.

In a preferred embodiment, a flow rate provided by the second-dimension fluid drive during the withdrawing phase essentially equals the sum of the eject flow rate provided by the modulation pump during the ejection phase, and absolute value of a withdraw flow rate of the modulation pump during the withdrawing phase, and a flow rate of the second-dimension fluid drive during the ejection phase.

In an embodiment, the sample separation apparatus comprises a control device configured for controlling one or more of the fluidic devices thereof to keep the pressure at the position or in the segment at a predefined value. Hence, the control unit such as a microprocessor or the like may control operation of the first supply unit, a pumping performance of the second supply unit. It may be configured so that the flow rate of the fluid is allowed to vary over time. In accordance to this, the parameter kept constant over the measurement may be the pressure.

In an embodiment, the sample separation apparatus comprises a control device configured for controlling the first-dimension separation unit to execute a first separation within a defined measurement volume interval (in accordance with a given first run or gradient volume indicating a volume of a mobile phase needed for separation on the first separation column) for separating the fluidic sample into a plurality of fractions, and controlling the second-dimension separation unit to execute a sequence of second separations (each in accordance with a given second run or gradient volume indicating a volume of a mobile phase needed for performing a separation on the second separation column) within the measurement volume interval for further separating at least a part of the separated plurality of fractions into a plurality of sub-fractions. In the context of this application, the term "first separation" may particularly denote a procedure according to which a fluidic sample is to be separated in the first-dimension separation unit based on a first control scheme, which may be a volume-based control scheme. This may include a plurality of steps to be carried out subsequently. The execution of these steps occurs over a so-called measurement volume interval. In a preferred embodiment, the first separation is a gradient run by which the fluidic sample is separated in the first-dimension separation unit by changing a ratio of two solvents gradually, thereby selectively releasing individual fractions of the fluidic sample on the first-dimension separation unit. In the context of this application, the term "plurality of second separations" may particularly denote separations which are to be executed by the second-dimension separation unit based on a second control scheme, which is preferably a volume-based control scheme. In a preferred embodiment, each of the second separations is executed over a time interval being smaller than the measurement time interval relating to the first separation. In other words, several or many second separations may be carried out within a time interval of the first separation. This means that the fluidic sample is split, chopped or separated into the number of fractions during execution of the first separation, whereas the second separations further separate the separated fractions into further subfractions by applying another, at least partially different, if not completely orthogonal separation criterion. For instance, a number of second separations relating to one first separation may be in a range between 5 and 1000, particularly between 10 and 200. In the context of this application, the term "measurement interval" may particularly denote an entire or a part of a time interval or volume interval of a mobile phase required for executing the first separation. Such a volume interval may be in a range between 50 µl and 50 ml, particularly between 400 µl and 4 ml. It may relate to the total volume of the separation unit and to the volume of a mobile phase required for executing a separation run on a first-dimension separation unit configured as a liquid chromatography column. In accordance with the long-lasting first separation, the sample can be separated into a plurality of fractions by a first separation criterion (for instance the hydrophobicity, the molecular mass, etc.). In the subsequent, at least partially orthogonal second separations, each fraction separated during the first separation can be further separated into a plurality of sub-fractions (particularly in accordance with another separating criterion such as chemical property of the particles). The result of such a separation can be displayed as a topographic map in a two-dimensional coordinate system (or as a surface in a 3-dimensional coordinate system), both axes representing the corresponding retention volume or time or other relevant coordinate of a separation in a first or a second separation respectively.

In an embodiment, the first-dimension separation unit and the second-dimension separation unit are configured so as to execute the respective sample separation in accordance with different separation criteria, particularly in accordance with at least partially orthogonal separation criteria. In this context, the term "orthogonal" may particularly denote the low degree or even lack of correlation between the retention parameters in the first and the second dimension in general or at least for the expected sample components. Exemplary embodiments of the invention make benefit of this cognition and propose to adjust the parameters under a consideration of the fact that the separation criteria of the two separation units are not necessarily completely independent from one another.

In an embodiment, the system comprises a detector unit arranged downstream of the first-dimension separation unit and upstream of the second-dimension separation unit. Such a detector unit (for detecting fractions of the fluidic sample) may be arranged in addition to another detector unit being located downstream of the second-dimension separation unit.

In an embodiment, the system comprises a sample treatment unit configured for additionally treating the fluidic sample after treatment by the first-dimension separation unit and before being delivered into the second-dimension separation unit, for instance, such an additional treatment may be an addition of chemical reagents, a chemical modification, a chemical derivatization, a reaction detection, a catalytic transformation, an irradiation, and/or a heating.

In an embodiment, the pressure is adjusted at the predefined position by controlling the flow rate of the second-dimension fluid drive. The flow rate may be the transported fluid volume per time interval.

In an embodiment, the pressure is adjusted at the predefined position even when a gradient program of the second-dimension fluid drive will change the viscosity of the fluid flowing through the second-dimension separation unit.

In an embodiment, the first-dimension separation unit and/or the second-dimension separation unit may be configured for performing a separation in accordance with liquid chromatography, supercritical-fluid chromatography, capillary electrochromatography, electrophoresis and gas chromatography. However, alternative separating technologies may be applied as well.

The first- and/or second-dimension separation unit may be filled with a separating material. Such a separating material which may also be denoted as a stationary phase may be any material which allows a different degree of interaction with sample components so as to be capable of separating different components of such a sample. The separating material may be a liquid chromatography column filling material or packing material comprising at least one of the group consisting of polystyrene, zeolite, polyvinyl alcohol, polytetrafluorethylene, glass, polymeric powder, carbon, graphite, alumina, zirconia, silicon dioxide, and silica gel, or any of above with chemically modified (coated, capped etc.) surface. However, any packing material can be used which has material properties allowing a sample passing through this material to be separated into different components, for instance due to different degrees of interactions or affinities between the packing material and fractions of the analyte. In still another embodiment a sample separation unit, particularly a second sample separation unit, may be a so called open tubular column, i.e. a channel without filling material but with walls capable of selective interaction with sample components.

At least a part of the first- and/or second-dimension separation unit may be filled with a separating material, wherein the separating material may comprise beads or particles having a size in the range of essentially 0.1 µm to essentially 50 µm. Thus, these beads may be small particles which may be filled inside the separation unit, which in an embodiment may be represented by a separation section of a microfluidic device. The beads may have pores having a size in the range of essentially 0.005 µm to essentially 0.2 µm. The fluidic sample may enter the pores, wherein an interaction may occur between the fluidic sample and the surface of the pores. Alternatively, a separating material can be a monolithic porous material, comprising pores in the range of 0.005 µm to essentially 0.2 µm as known in the art (so-called monolithic columns).

The sample separation apparatus may be configured as a fluid separation system for separating components of the sample. When a mobile phase including a fluidic sample is passed through the fluidic device, for instance by applying a high pressure, the interaction between a filling of the column and the fluidic sample may allow for separating different components of the sample, as performed in a liquid chromatography device.

The sample separation apparatus may also be configured as a fluid purification system for purifying the fluidic sample. By spatially separating different fractions of the fluidic sample, a multi-component sample, for instance a protein solution, may be purified. When a protein solution has been prepared in a biochemical lab, it may still comprise a plurality of components. If, for instance, only a single protein of this multi-component liquid is of interest, the sample may be forced to pass the columns. Due to the different interaction of the different protein fractions with the filling of the column, the different sample components may be distinguished, and one component or band of material may be selectively isolated as a purified sample.

The sample separation unit (of either the first dimension, the second dimension, or both) may be a chromatographic column for separating components of the fluidic sample. Therefore, exemplary embodiments may be particularly implemented in the context of a liquid chromatography apparatus.

The sample separation apparatus may be configured to conduct the mobile phase through the system by means of a high pressure, particularly of at least 400 bar, more particularly of at least 1000 bar.

The sample separation apparatus or its parts or sub-units may be configured as a microfluidic device. The term "microfluidic device" may particularly denote a fluidic device as described herein which allows to convey fluid through microchannels having a dimension in the order of magnitude of less than 500 µm, particularly less than 200 µm, more particularly less than 100 µm or less than 50 µm or less. The sample separation apparatus may also be configured as a nanofluidic device. The term "nanofluidic device" may particularly denote a fluidic device as described herein which allows to convey fluid through nanochannels having even smaller dimensions than the microchannels.

BRIEF DESCRIPTION OF DRAWINGS

Other objects and many of the attendant advantages of embodiments of the present invention will be readily appreciated and become better understood by reference to the FIG. 1 illustrates a liquid chromatography system according to an exemplary embodiment.

FIG. 3 illustrates a first separation according to which the first-dimension chromatographic column is operated in accordance with a first volume-based control scheme.

FIG. 4 illustrates another diagram showing a sequence of multiple second separations as performed by a second-dimension liquid chromatography column in accordance with a second volume-based control scheme.

7A schematically illustrates another embodiment of a modulation unit of the sample separation apparatus in a withdrawing mode of operation.

Figure 7A:
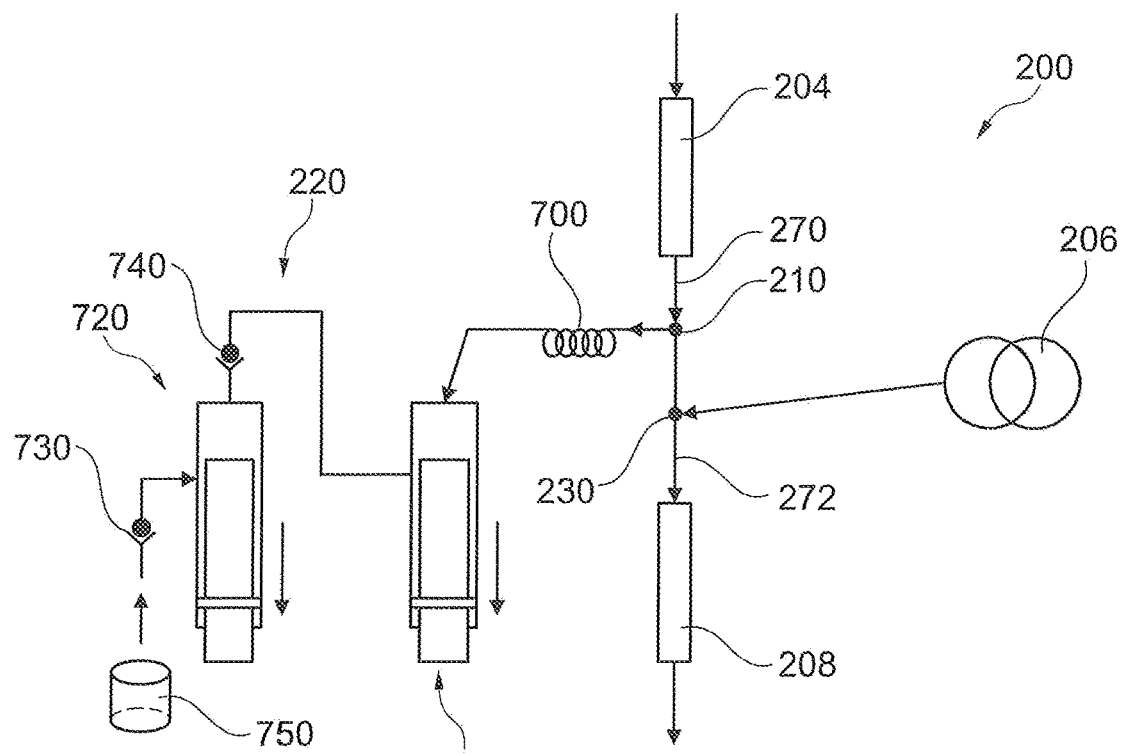
Figure 7B:
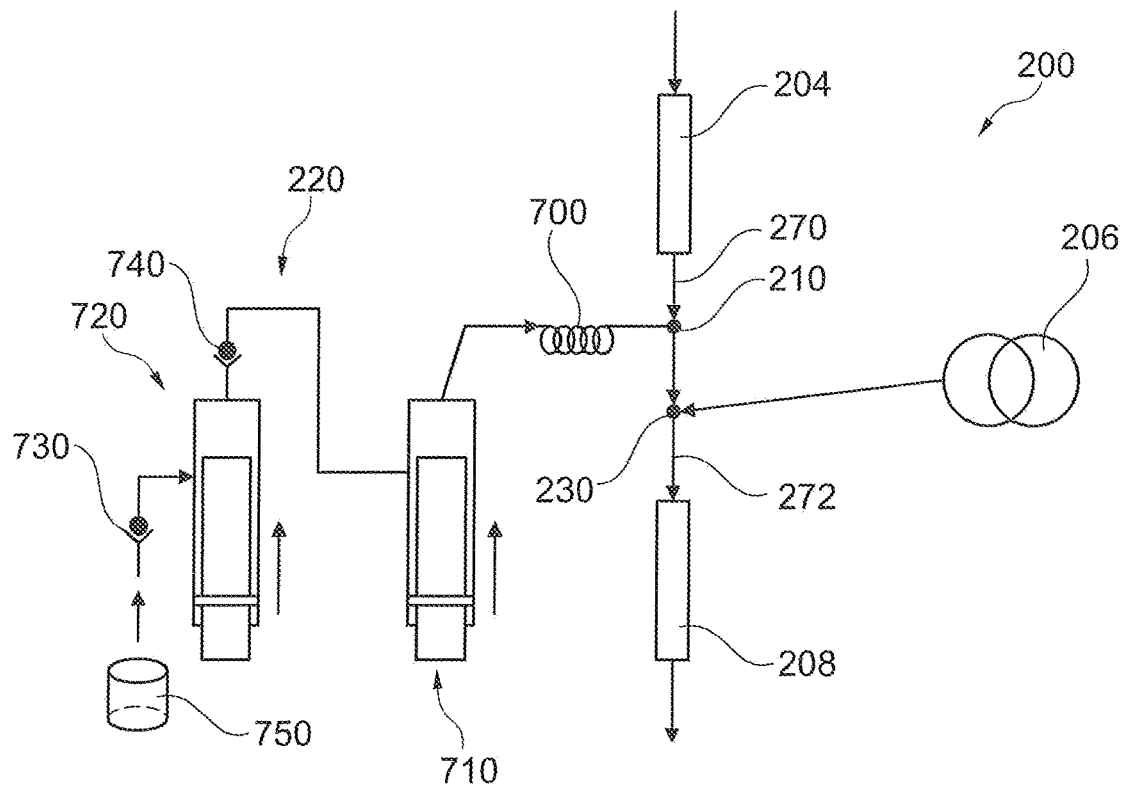

FIG. 7B schematically illustrates the modulation unit of FIG. 7A in an ejecting mode of operation.

Figure 8:
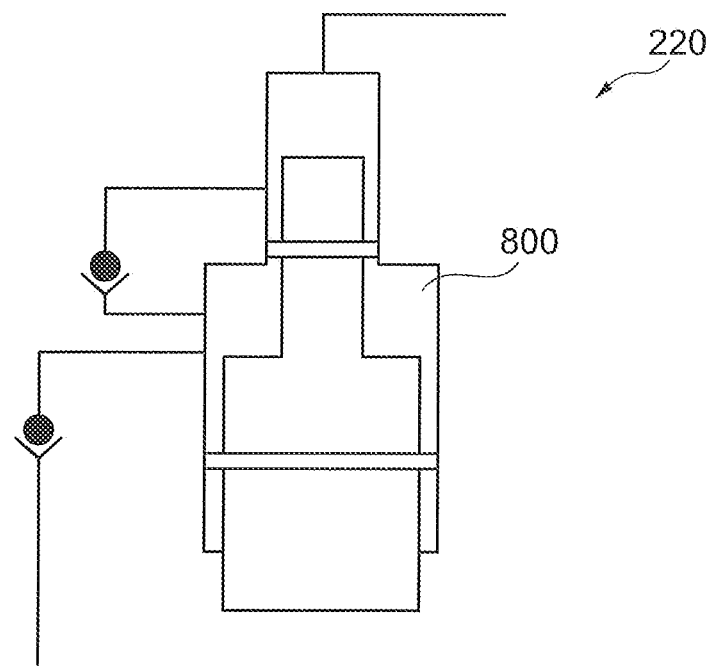

FIG. 8 shows an embodiment of the modulation unit as a two-stage step-piston pump.

Figure 9:
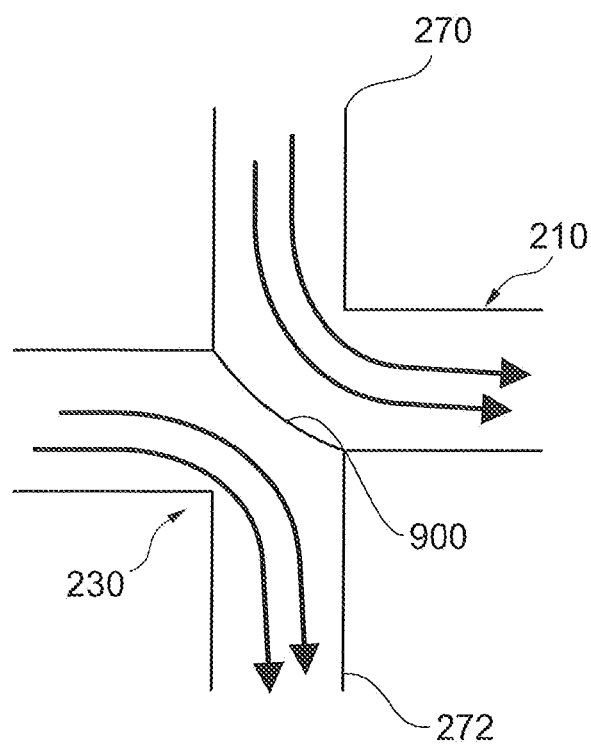

FIG. 9 depicts an embodiment of a flow path between a first-dimension outlet and a second-dimension inlet of the sample separation apparatus, wherein a first coupling point and a second coupling point are substantially physically overlapping.

Figure 10:
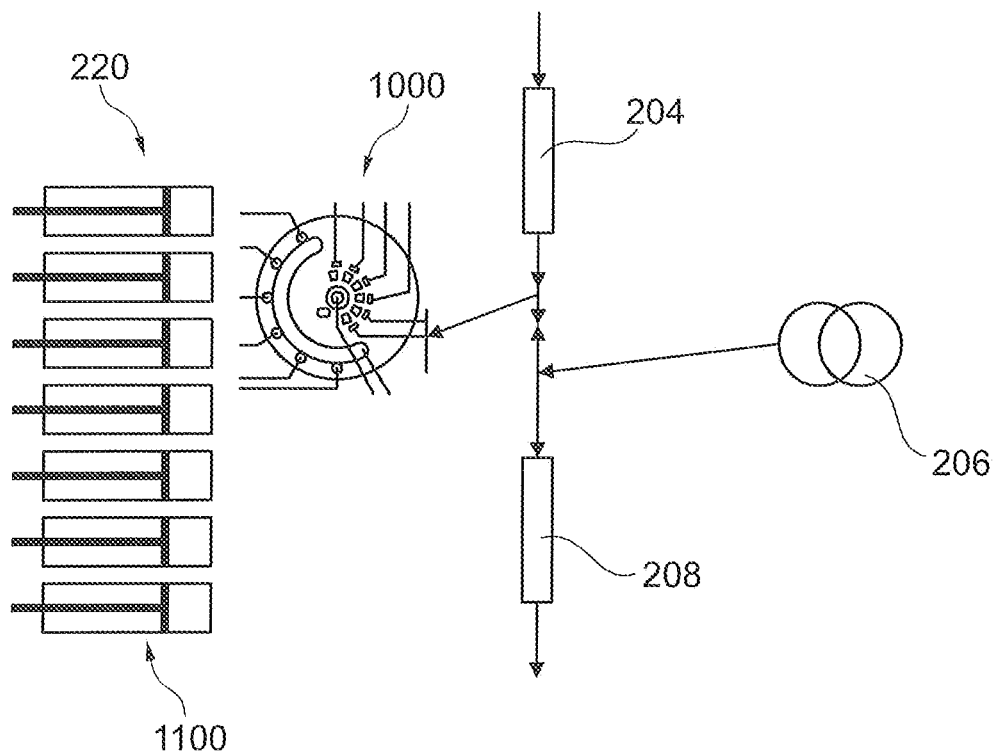

FIG. 10 illustrates a modulation unit according to another embodiment.

Figure 11:
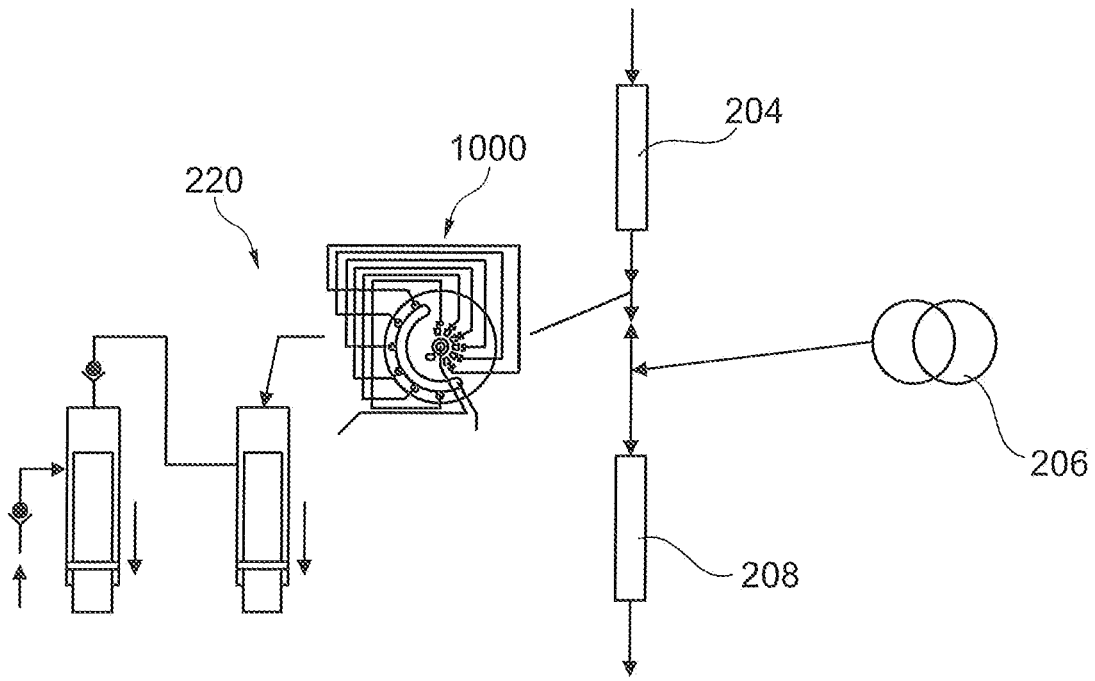

FIG. 11 illustrates a modulation unit according to another embodiment.

Figure 12:
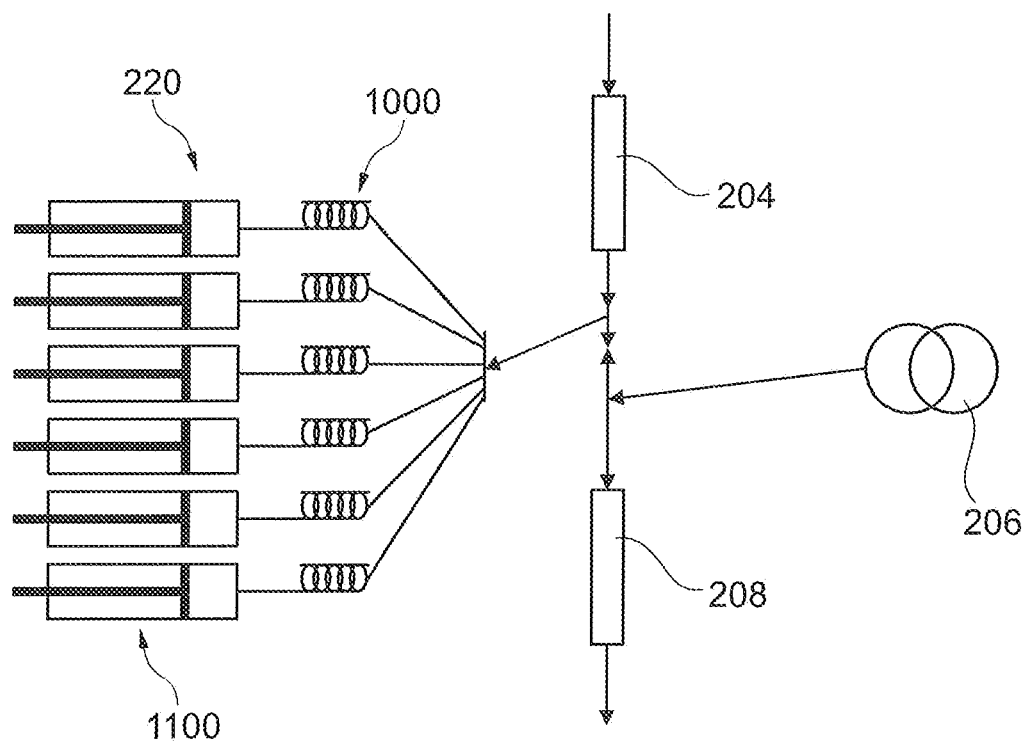

FIG. 12 illustrates a modulation unit according to another embodiment.

The illustration in the drawing is schematic.

DETAILED DESCRIPTION

According to an exemplary embodiment of the invention, a two-dimensional liquid chromatography (2D-LC) system is provided for precise and reliable two-dimensional separations. A special control mode can be provided for tandem-LC to support rapid separations (of less than 30 seconds).

In 2D-LC, often there is a requirement to have both a very fast execution of elution gradients, and accurate and precise delivery of flow at a target compositional gradient. In an ever-increasing interest to increase peak capacity (total number of peaks that can be isolated in a single experiment) several parameters are optimized. In application to 2D-LC this means, along with others, smaller size of packing material, smaller separation columns, faster linear speed of solutes during separation, faster compositional gradients, longer separation beds, etc. Putting all this together leads to the fact that proper or optimized operation will happen under high stress in rapid cycles. This may bring together two problems basically: a) predictable performance under dynamic conditions, and b) reliable operation under frequent repeated stress.

In order to achieve speedy and predictable gradients, it is advantageous to avoid excessive dispersion of the fluid flow and excessive elasticity of the system and its elements. Elements like mixers or dampers can be avoided for this purpose. This way the bandwidth of systems may be increased, which then increases demands on the robustness due to stronger impact of dynamic disturbances.

In view of the foregoing, when using tandem-LC configurations, the pressure level on the first-dimension column is basically offset by the pressure drop across the second-dimension column. Usually, when a gradient is run, for instance in reversed phase separations from water to organic, the viscosity is modulated, which in turn results in a pressure profile (with pressure variation up to by a factor of three for acetonitrile (ACN) or methanol (MeOH)). As outlined in the aforementioned WO2013167193A1, tandem-LC in itself brings key advantages usable by embodiments of the invention, inter alia:

i) elimination of pressure-breakdown on modulation, which is advantageous for baseline quality and repeatability of separations;

ii) in view of the reduction of pressure variation on second-dimension gradients, the repeated pressure cycles in sub-minute time range can be eliminated, and this results in improved lifetime for the heavily loaded column when constant pressure volume-based operation mode is applied.

Referring now in greater detail to the drawings, FIG. 1 depicts a general schematic of a liquid separation system 10. A first pump 20 receives a mobile phase (also denoted as fluid) as a whole or as individual components that get mixed together by the first pump 20, from a first solvent supply 25, typically via a first degasser 27, which degases and thus reduces the amount of dissolved gases in the mobile phase. The first pump 20—as a mobile phase drive—drives the mobile phase through a first separating device 30 (such as a chromatographic column) comprising a stationary phase. A sampling unit 40 can be provided between the first pump 20 and the first separating device 30 in order to subject or add (often referred to as sample introduction) a sample fluid (also denoted as fluidic sample) into the mobile phase. The stationary phase of the first separating device 30 is configured for separating compounds of the sample liquid.

A second pump 20' receives another mobile phase (also denoted as fluid) from a second solvent supply 25', typically via a second degasser 27', which degases and thus reduces the amount of dissolved gases in the other mobile phase. By a modulation assembly 90, the first dimension (reference numerals 20, 30, . . . ) of the two-dimensional liquid chromatography system 10 of FIG. 1 may be fluidically coupled to the second dimension (reference numerals 20', 30', . . . ). The fluidic sample is separated into multiple fractions by the first dimension, and each fraction is further separated into multiple sub-fractions by the second dimension. The way of operation of the modulation assembly 90 and a way of arranging the fluidic paths fluidically coupling the two dimensions and implementing the sample modulation will be described below referring to FIG. 2.

A detector 50 is provided for detecting separated compounds of the sample fluid. A fractionating unit 60 can be provided for collecting separated compounds of sample fluid.

While each of the mobile phases can be comprised of one solvent only, it may also be mixed from plural solvents. Such mixing might be a low pressure mixing and provided upstream of the pumps 20, 20', so that the respective pump 20, 20' already receives and pumps the mixed solvents as the mobile phase. Alternatively, each pump 20, 20' might be comprised of plural individual pumping units, with plural of the pumping units each receiving and pumping a different solvent or mixture, so that the mixing of the mobile phase (as received by the respective separating device 30, 30') occurs at high pressure and downstream of the pump 20, 20' (or as part thereof). Alternatively, the pumps 20, 20' may internally mix or proportionate multiple solvents and then pump the mixture into the system. The composition of the mobile phase may be kept constant over time, the so called isocratic mode, or varied over time, the so called gradient mode.

A data processing unit (or computing device, system controller, control unit, etc.)70, which can be a conventional PC or workstation, might be coupled (as indicated by the dotted arrows) to one or more of the devices in the liquid separation system 10 in order to receive information and/or control operation. For example, the data processing unit 70 might control operation of the pump 20, 20' (for instance setting control parameters) and receive therefrom information regarding the actual working conditions (such as output pressure, flow rate, etc.). The data processing unit 70 might also control operation of the solvent supply 25, 25' (for instance setting the solvent/s or solvent mixture to be supplied) and/or the degasser 27, 27' (for instance setting control parameters such as vacuum level) and might receive therefrom information regarding the actual working conditions (such as solvent composition supplied over time, flow rate, vacuum level, etc.). The data processing unit 70 might further control operation of the sampling unit 40 (for instance controlling sample injection or synchronizing sample injection with operating conditions of the pump 20). The respective separating device 30, 30' might also be controlled by the data processing unit 70 (for instance selecting a specific flow path or column, setting operation temperature, etc.), and send—in return—information (for instance operating conditions) to the data processing unit 70. Accordingly, the detector 50 might be controlled by the data processing unit 70 (for instance with respect to spectral or wavelength settings, setting time constants, start/stop data acquisition), and send information (for instance about the detected sample compounds) to the data processing unit 70. The data processing unit 70 might also control operation of the fractionating unit 60 (for instance in conjunction with data received from the detector 50) which provides data back.

In both sample separation dimensions (first dimension: pump 20, separating device 30; second dimension: pump 20', separating device 30') of the 2D-LC system shown in FIG. 1, operation may be performed in accordance with a volume-based control scheme, e.g. as outlined in the aforementioned WO2009062538A1, rather than by a time-based control scheme. Hence, the separation of the fractions and sub-fractions of the fluidic sample is performed in terms of delivered or run volumes rather than in terms of time slices.

In the following, referring to FIG. 2, a two-dimensional liquid chromatography apparatus 200 according to an exemplary embodiment of the invention will be explained.

The sample separation apparatus 200 is capable of separating a fluidic sample, which is injected by a sample injector 236 into a mobile phase, first into a plurality of fractions (each representing a group of molecules) by a first-dimension separation unit 204 (which may be a chromatographic column). This separation in a first dimension is performed while the sample is conducted between an inlet 274 and a first-dimension outlet 270 of the first-dimension chromatographic column 204. Later, each of these fractions may be further separated into a plurality of sub-fractions by a second-dimension chromatographic column 208. This separation in a second dimension can be performed while a portion of the effluent of the first separation unit sample is conducted between a second-dimension inlet 272 and an outlet 276 of the second-dimension chromatographic column 208. The reason why each of the fractions can further be split into a plurality of sub-sections by the second-dimension chromatographic column 208 is that the second-dimension chromatographic column 208 may be configured so as to have another separation criterion as compared to the first-dimension chromatographic column 204. This may for instance be achieved by different chemicals, different solvent composition, different temperature, used in the two separation systems.

Figure 2:
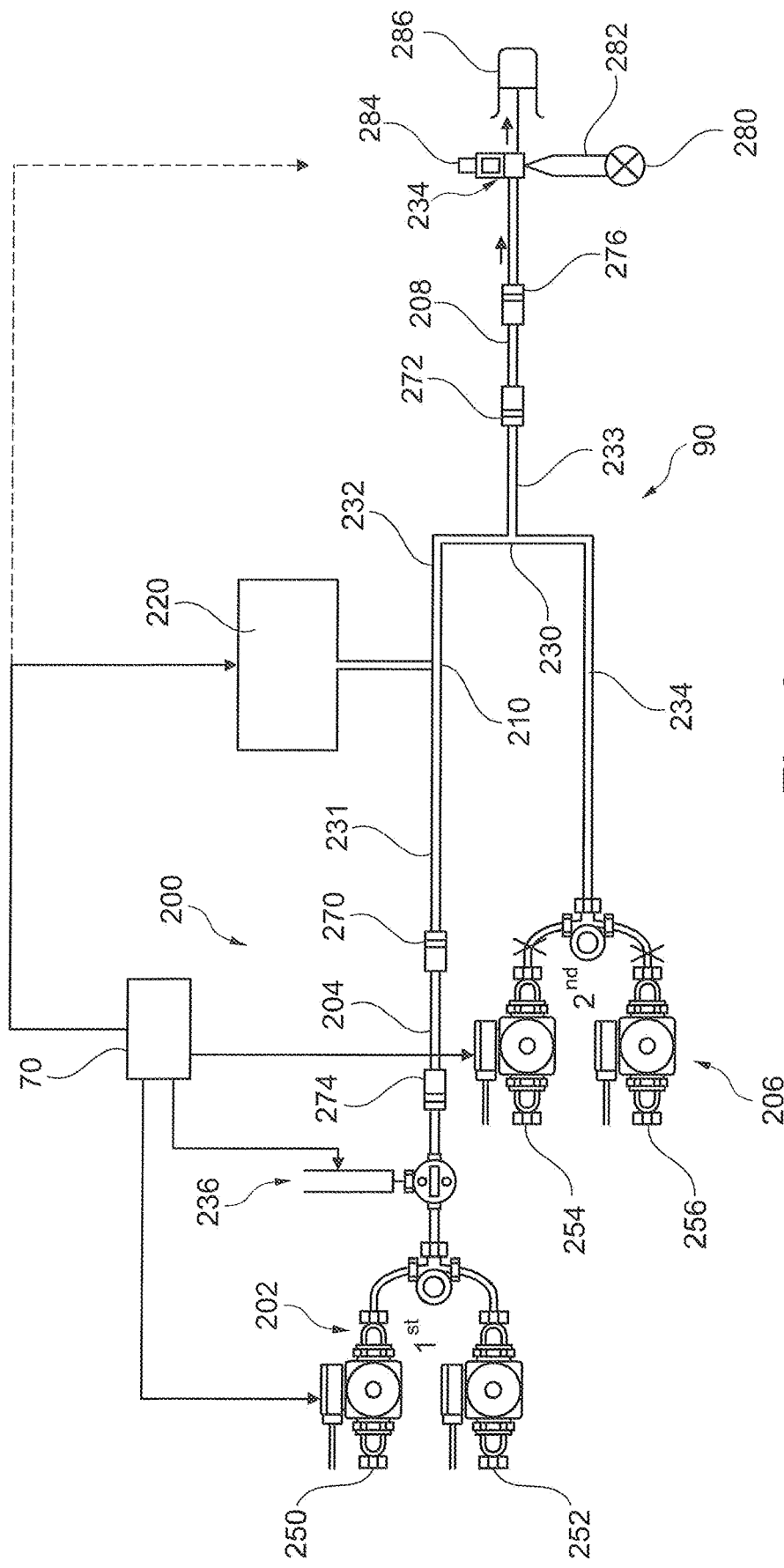
FIG. 2 illustrates a sample separation apparatus according to an exemplary embodiment.

In the example of FIG. 2, the two-dimensional liquid chromatography apparatus 200 comprises a first binary pump 202. The first binary pump 202 is configured for conducting the fluidic sample to be separated through the first-dimension chromatographic column 204. For this purpose, the first binary pump 202 provides a mixture of a first solvent 250 (such as water) and a second solvent 252 (such as acetonitrile, ACN). The first binary pump 202 mixes these two solvents to form a mobile phase composition which is pumped towards the sample injector 236. At the sample injector 236, the actual fluidic sample is added to (also referred to as injected into) the mobile phase, so the fluidic sample and the mobile phase are then transported towards the first-dimension chromatographic column 204.

In the sample injector 236, an injection needle can be immersed into a vial accommodating the fluidic sample (not shown). The fluidic sample may then be sucked into the injection needle and a loop fluidically connected thereto. Subsequently, the injection needle may be driven into a seat so as to then introduce the fluidic sample into the mobile phase. Alternatively, the sample injector 236 may be embodied to provide so-called Feed Injection, as disclosed e.g. in US20170343518A1 by the same applicant. Feed injection can be provided by coupling a sample-containing conduit to the high-pressure path between pump 202 and the first-dimension chromatographic column 204 and pressurizing the sample-containing conduit in order to eject the sample into the high-pressure path.

In the first-dimension chromatographic column 204, the different fractions of the fluidic sample are trapped at the separating material of a column and are later individually released from the column during a gradient run. Therefore, at the fluid first-dimension outlet 270 of the first-dimension separation column 204, the various fractions of the sample are already separated.

Downstream to the first-dimension outlet 270 is provided a first coupling point 210 to which a modulation unit 220 is coupling to, which will be explained later in greater detail. Further along the flow path towards the second-dimension inlet 272 and downstream to the first coupling point 210 is provided a second coupling point 230 to which a second-dimension pump 206 is coupling.

In the example of FIG. 2, the second-dimension pump 206 is provided as a second binary pump 206, which is preferably operated at a significantly higher flow rate as compared to the first binary pump 202. For instance, the flow rate of the second binary pump 206 may be 4 ml/min, whereas a flow rate of the first binary pump 202 may be 100 µl/min. As the first binary pump 202, also the second binary pump 206 can provide a mixture of a first solvent 254 with a second solvent 256. The solvents 254, 256 may or may not be the same as the solvents 250, 252. The apparatus 200 is configured such that the flow generated by the second binary pump 206 may further transport the fluidic sample, already separated or treated by the first-dimension separation column 204 towards the second-dimension chromatographic column 208 which is arranged downstream of the first-dimension chromatographic column 204.

Each of the first and second coupling points 210 and 230 may be embodied as a fluidic T-piece, a fluidic Y-piece, a fluidic X-piece, or similar, as well known in the art valve arrangement 95 is possible in an error-robust (or fault tolerant) way, because the initial position of the rotor-stator system after assembly is defined by the anti-rotation device 126.

As apparent from FIG. 2, the first-dimension outlet 270 of the first-dimension separating unit 204 and the binary pump 206 remain always in fluid communication with one another, i.e. are hydraulically coupled. This provides the advantageous effect that no or basically no abrupt pressure variations occur e.g. as a result of any switching process (as required in most conventional two-dimensional separations).

Furthermore, a detector 234 is provided which is capable of detecting the separated components of the fluidic sample by an electromagnetic radiation-based detection principle. In a particular embodiment, the separated fluidic sample flows through a flow cell and is irradiated with electromagnetic radiation from a light source 280. The beam 282 of the light source 280 passes through the flow cell and can be detected by a detector 284. For instance, an absorbance measurement may be performed. The wavelength range in which a measurement is carried out can for instance be the visible range or in the ultraviolet range.

After having passed the detector 234, the fluidic sample can be collected e.g. in a waste container 286 or by a fractionating unit 60. It should be mentioned that in the whole fluidic path the fluidic sample is under a pressure being higher (particularly significantly higher) than ambient pressure at any location upstream of the outlet terminal 276 of the second-dimension separation column 208 which is advantageous for pressure ripple suppression.

The architecture of FIG. 2 is significantly simpler than known approaches, since only simple coupling points 210 and 230 but no valve (as applied in most conventional 2DLC systems) are provided between first and second dimension, thus allowing to eliminate abrupt pressure changes or shocks. The pressure which is generated in the second dimension is, via the second coupling point 230, e.g. a T-piece, always substantially applied at the first-dimension outlet 270 of the first dimension, so that the second dimension provides a pressure offset for the entire first dimension.

Furthermore, a control unit 70 (such as a processor, for instance a microprocessor or a central processing unit, CPU) is provided which is capable of controlling all the devices and fluidic components shown in FIG. 2. This is illustrated schematically by the arrow lines directed from the control unit 70 towards the corresponding components. As shown in the embodiment of FIG. 2, the control unit 70 is preferably controlling one or more of the first-dimension separation unit 204, the second-dimension separation unit 208, the sample injector 236, the modulation unit 220, and the detector 284 as well as other components coupled to the second-dimension outlet 276 (indicated by dotted line). The control unit may coordinate operation of the respective components, such as the sample injector 236, the modulation unit 220, and/or the detector 284 with the control of the pump operation of pumps 202, 206. Moreover, the piston motion of the pumps 202, 206 may be synchronized and adapted to correspond to the operation of such other components.

Advantageously, the control device 70 is configured for, usually indirectly, adjusting the pressure in the segment or fluidic path between the first separating column 204 and the second separating column 208 to a constant value. More precisely, control device 70 may control or command the pumps 202, 206 and/or other (sub) units of the system so as adjust pressure. This can for instance be performed by adjusting the flow rate conveyed by the second pump 206 and optionally also adjusting the flow rate of the first pump 202 in a coordinated manner. By keeping the pressure value between the first separating unit 204 and the second separating unit 208 at a constant level over the entire separation procedure (or alternatively to follow a predefined course, for instance a pressure program over volume, over the entire separation procedure), the fluidic components associated therewith are only subjected to a constant mechanical stress over the entire separation procedure so that their damage or deterioration in view of pressure variations can be suppressed or even eliminated. Therefore, the lifetime or service intervals of the entire separation system 200 can be significantly increased by controlling the fluidic path between the separating units 204 and 208 to operate under constant (or at least defined) pressure conditions. Thus, a two-dimensional chromatogram (or separation results) can be acquired in dependence of the run volume, i.e. the volume of mobile phase flowing through the respective separating column 204 and 208 during the liquid chromatography separation, whereas the run volume for the first dimension is preferably registered starting at the start of the first-dimension separation, whereas the registered run volume for the second dimension is preferably reset and registered ab initio at the start point of each and every second-dimension separation. Thus, particularly applying a volume based liquid chromatographic separation scheme allows the pressure at an outlet of the second pump 206 to be adjusted to a constant value.

For the purpose of pressure regulation, one or more sensors may be implemented particularly along the flow path between the first-dimension outlet 270 of the first separating column 204 and the second-dimension inlet 272 of the second separating column 208 to measure an actual pressure value at the respective sensor position. In FIG. 2, some exemplary positions of such a sensor capable of sensing information indicative of a local pressure value at the position of the respective sensor are indicated by crosses. For instance, such a sensor may be located in a fluidic conduit (or section) 231 between the first-dimension outlet 270 and the first coupling point 210, a fluidic conduit (or section) 232 between the first coupling point 210 and the second coupling point 230, a fluidic conduit (or section) 233 between the second coupling point 230 and the second-dimension input 272, and a fluidic conduit (or section) 234 between the second-dimension fluid drive 206 and the second coupling point 230. Preferably such a pressure sensor may be located in or be a constituent, component, element or a part of the second-dimension separation pump 206.

The pressure sensor may provide feedback information enabling the control unit 70 to have control over pressure regulation and adjustment. The modulation unit 220 provides in combination with the pump 206 a periodic interrupted (chopped) delivery of the fractions of the effluent of the first dimension to the second dimension, as will be explained below.

In the exemplary embodiment of FIG. 2, the modulation assembly 90 encompasses the first coupling point 210, the modulation unit 220, the second coupling point 230, the fluidic conduit 232, and parts of the fluidic conduit 231, 233, and 234.

Still referring to the operation principle of the control device 70 in the context of a liquid chromatography separation method, FIG. 3 shows a diagram 300 having an abscissa 302 along which a volume (of a conducted mobile phase) delivered by the first pump 202 is plotted and having an ordinate 304 along which a solvent composition as mixed by the first binary pump 202 is plotted. The control device 70 is configured for controlling the first-dimension separation column 204 to execute the first separation 306 as shown in FIG. 3 within a measurement volume interval which is denoted with reference numeral 308 in FIG. 3. In the shown embodiment, the measurement volume interval is 30 times a reference volume $V_0$. With this measurement volume 30 $V_0$ of the mobile phase, the gradient run in accordance with the first separation program 306 is carried out.

FIG. 4 shows a diagram 400 indicating a plurality of second separations 402. Diagram 400 schematically corresponds to diagram 300, whereas the volume axis 302 representing the volume delivered by the first pump 202 is shown on another scale. As can be taken from FIG. 4, the control device 70 controls the second-dimension separation column 208 and the second pump 206 to execute all (or at least all but the last two) of the plurality of second separations 402 nearly within the measurement volume interval 308. Each of the second separations 402 relates to a volume delivered by the first pump 202 of about the reference volume $V_0$, which also can be considered an aliquot volume. Thus, in terms of conducted mobile phase volume, many second separations 402 are carried out within one first separation 306. Thus, each of the fractions already separated by the first-dimension chromatographic column 204 can be further separated into a plurality of sub-fractions by the second separation column 208. It should be noted, that each one of the plurality of the second separations as shown in the FIG. 4 corresponds to a non-zero mobile phase volume delivered by the second separation pump 206, particularly of at least $V_0$, or of at least 2 $V_0$, more particularly of at least 10 $V_0$ or 40 $V_0$. It should also be noted, that the gradient programs for the plurality of the second-dimension separations need not necessarily be the same for each second-dimension separation but may be changed along with the progress of the first-dimension separation, and neither must the portions of the fluid delivered by the first-dimension pump and referred to as $V_0$ be all of exactly the same volume.

Figure 5:
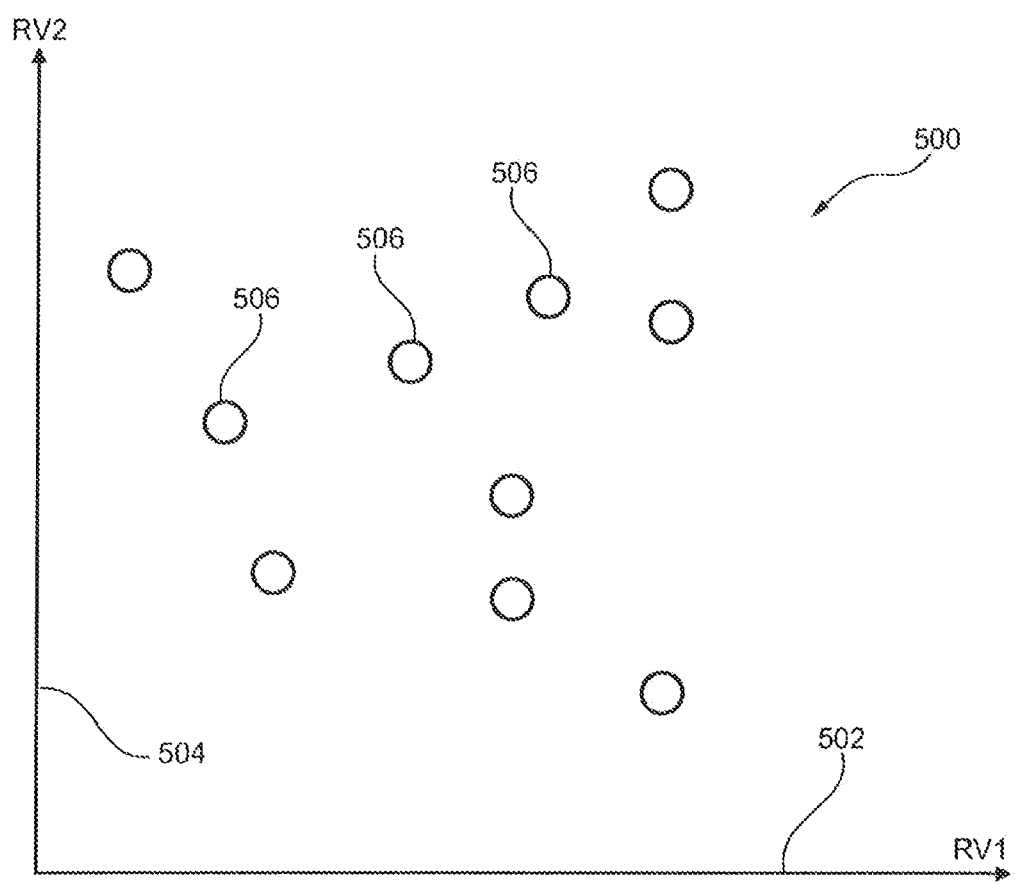
FIG. 5 illustrates a diagram which shows the result of a two-dimensional liquid chromatography experiment, wherein the respective retention volumes are plotted along the two coordinate axes.

FIG. 5 now schematically represents a two-dimensional chromatogram 500 as can be obtained when executing the first separation of FIG. 3 and the second separations of FIG. 4. A first retention volume 502 in accordance with the first-dimension chromatographic separation (see column 204 and FIG. 3) is plotted along an abscissa 502, whereas a second retention volume in accordance with the second-dimension chromatographic separation (see column 208 and FIG. 4) is plotted along an ordinate 504. The detector signal can be represented in the shown 2-dimensional plot as color map, contour map, spots, numbers or alike. As can be taken from FIG. 5, a plurality of peaks 506 can be detected.

As explained above, the sample separation apparatus 200 is embodied in a so-called tandem-LC scheme, i.e. the outlet 270 of the first-dimension column 204 is fluidically connected to the inlet 272 of the second-dimension column 208. Thus, an inlet pressure of the second dimension is substantially the same or at the same level as the outlet pressure of the first dimension.

In contrast to the tandem-LC set up as disclosed in the aforementioned WO2013167193A1, no valve or other switching unit is provided between the first-dimension outlet 270 and the second-dimension inlet 272. However, the fluidic coupling (e.g. provided by one or more conduits) from the first-dimension outlet 270 to the second-dimension inlet 272 provides two coupling points (allowing side fluidic connections) 210 and 230. Similar to one of the functionalities of the fluidic valve in the aforementioned WO2013167193A1, the second coupling point 230 allows fluidic coupling of the second-dimension fluid drive 206, which may provide a solvent serving as a diluent and/or a gradient for the second-dimension separation provided by the second-dimension separation unit 208. The first coupling point 210, however, allows coupling of the modulation unit 220 (which may be a modulation pump or modulation syringe), which is configured for alternatingly providing: step A—withdrawing phase—withdrawing effluent of the first-dimension downstream of the column 204 as provided at the first-dimension output 270 and storing such withdrawn effluent within the modulation unit 220, and step B—ejection phase—ejecting the stored effluent into the first coupling point 210.

Operation of the modulation unit 220 is preferably provided so that—during step A—no effluent from the first dimension but only mobile phase (e.g. gradient) as provided by the second-dimension fluid drive 206 reaches the second-dimension separation unit 208. This can be achieved e.g. by drawing at a flow rate equal to or slightly higher than the flow rate provided by the first pump 206. The mass flow rates or the volumetric flow rates can be referred to a same condition, e.g. to the compressed solvent flow rate at the or near the first coupling point 210. The term "draw" in this context does not necessarily mean pulling or sucking the liquid into the modulation unit 220 but may also include providing the free volume to be filled, whereas the liquid is forced into the said volume by the pressure present at the or near the first coupling point 210.

Operation of the modulation unit 220 is preferably provided so that—during step B—the ejected stored effluent adds to (additional) effluent flowing during an ejection period of time from the first-dimension as (typically continuously) provided at the first-dimension outlet 270, so that the sample aliquot as provided downstream of the first coupling point 210 consists of stored sample volume (previously withdrawn by the modulation unit 220) and the effluent volume at the first-dimension outlet 270 (flown during the ejection).

During the ejection phase of step B, the second-dimension fluid drive 206 preferably delivers additional flow to "make-up" the total flow into the second dimension (at the second-dimension inlet 272) to a desired value, e.g. to the flow rate as used during a second-dimension separation or to the flow rate needed to keep a pressure at the second-dimension inlet 272 substantially constant. The solvent modulation ratio (dilution ratio) can be determined by the relation (such as proportioning or ratio) of the sum of ejection flow (from the modulation unit 220) plus the first-dimension flow at the first-dimension outlet 270 to the "make-up" flow (as provided by the second-dimension fluid drive 206 during the ejection phase of step B).

Embodiments and modes of operation for the modulation unit 220 shall now be explained in greater detail.

Figure 6A:
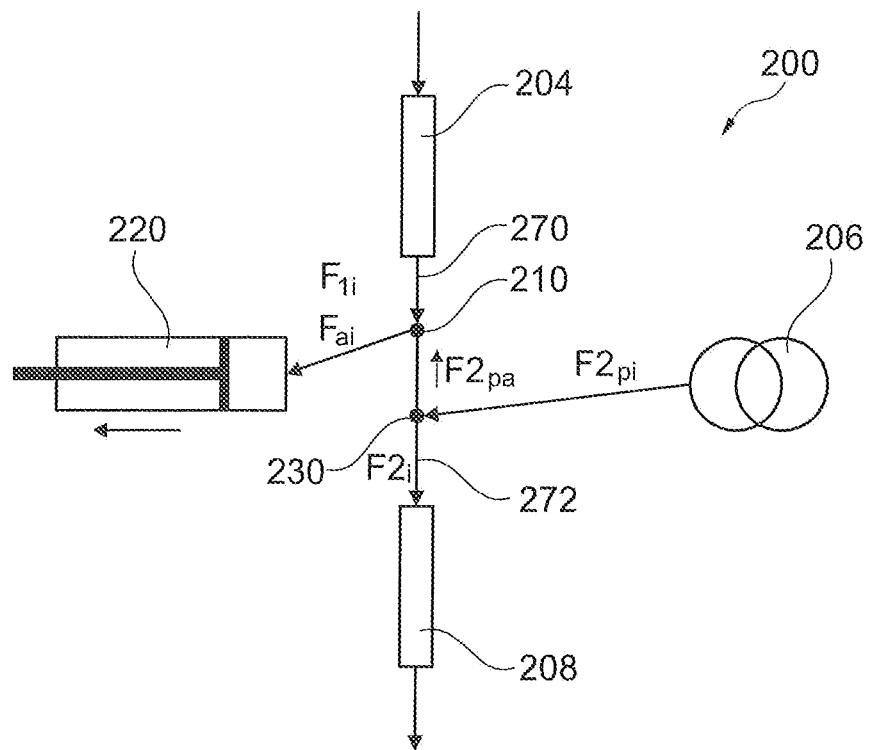
FIG. 6A schematically illustrates a modulation unit of the sample separation apparatus in a withdrawing mode of operation.
Figure 6B:
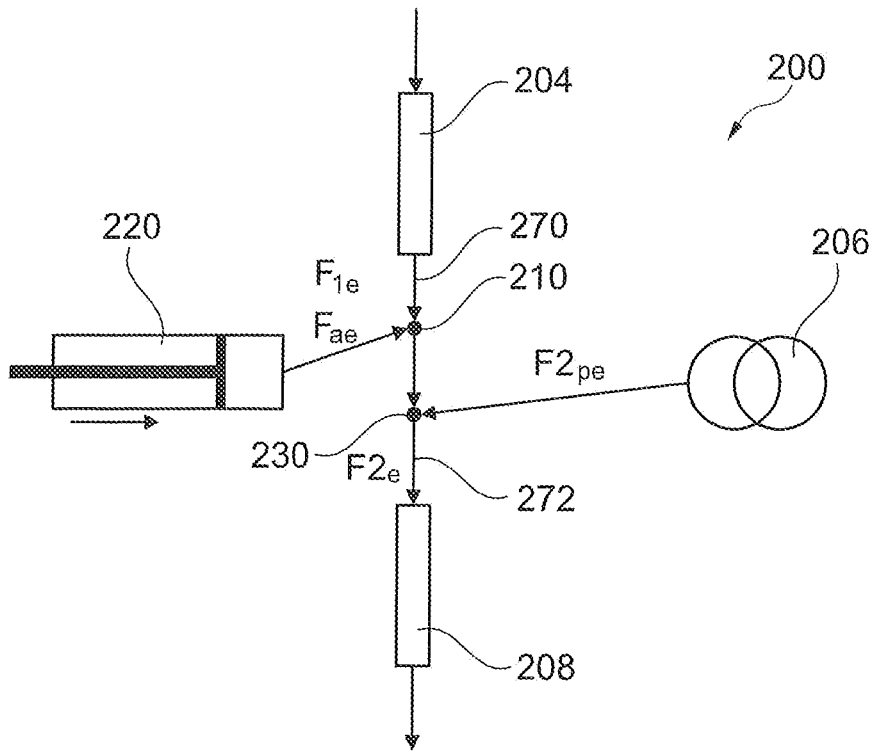
FIG. 6B schematically illustrates the modulation unit of FIG. 6A in an ejecting mode of operation.

FIGS. 6A and 6B schematically illustrate modes of operation of the modulation unit 220 within the sample separation apparatus 200. The modulation unit 220 is, for the sake of simplicity and explanation, embodied as a syringe-type pumping unit, i.e. a syringe allowing in one mode of operation (the withdrawing phase as depicted in FIG. 6A) to withdraw fluid from the first coupling point 210 and in another mode of operation (the ejection phase as depicted in FIG. 6B) to eject fluid into the first coupling point 210. Several embodiments are possible for implementing such modes of operation of the modulation unit 220, such as a simple modulation syringe as depicted in FIGS. 6A and 6B or any other type of pumping apparatus, as will also be shown later with respect to other figures, such as reciprocating pumps or pumping units, e.g. comprising one or more one-stage, two-stage, or plural-stage step-piston pumps. In both FIGS. 6A and 6B, the flow directions in the respective conduits are indicated by arrows.

FIG. 6A illustrates the withdrawing phase of step A, wherein a sampling is provided by the modulation unit 220. An aliquot flow Fai is withdrawn by the modulation unit 220 from the first coupling point 210. The flow rate of the aliquot flow Fai is preferably selected to be the same as or higher than an effluent flow rate F1$i$ at the first-dimension outlet 270, i.e. |Fai|>=|F1$i$|. Accordingly, as all flow F1$i$ from the first dimension is withdrawn into the modulation unit 220, there is effectively no flow from the first dimension into the second dimension. The flow rates mentioned here preferably refer to mass flow rates or volumetric flow rates referring to a same condition, e.g. to compressed solvent flow rates at the or near the first coupling point 210.

In case the flow rate of the aliquot flow Fai is selected to be higher than the effluent flow rate F1$i$, a partial flow F2$pa$ diverted from a flow F2$pi$ (as provided by the second-dimension fluid drive 206) is also drawn into the modulation unit 220 thus partly diluting the sample aliquot during the intake. Such flow rate of the aliquot flow Fai being higher than the effluent flow rate F1$i$ effectively prevents any effluent (from the first dimension) from passing into the second dimension, i.e. into the second-dimension inlet 272 and thus into the second-dimension separation unit 208. Such "reverse" flow F2$pa$ is preferably kept at low level, in particular in case the composition delivered by the second-dimension fluid drive 206 is time-dependent (e.g. in case of a gradient mode) and not necessarily suited for aliquot dilution.

During the withdrawing phase of step, A, the second-dimension fluid drive 206 provides a flow into the second dimension at a flow rate of F2$i$=F2$pi$−F2$pa$ and may thus drive a separation in the second dimension of the fraction of the sample previously introduced into the second dimension with first-dimension effluent.

In a preferred embodiment, the operation during the withdrawing phase of step A is provided at constant pressure operation mode, especially relating to the second fluid drive 206 (i.e. the sample separation apparatus 200 is controlled, e.g. by the data processing unit 70, in a way that the pressure between the first-dimension outlet 270 and the second-dimension inlet 272 is kept substantially constant, thus providing stable and reproducible pressure conditions at the first-dimension outlet 270). Further or alternatively, operation during the withdrawing phase may be provided as volume-based operation as explained above, so that operation is controlled based on fluid volume flows.

FIG. 6B illustrates the ejection phase of step B, wherein sample from the first dimension is provided (i.e. introduced) into the second-dimension separation. During this step B, the modulation unit 220 is operated and driven to eject the aliquot stored therein or at least a part thereof. A flow F2$e$, as provided into the second-dimension separation unit 208, represents the total of the partial flows F2$pe$ (from the second-dimension fluid drive 206), F1$e$ (from the first dimension at the first-dimension outlet 270), and Fae (as ejected by the modulation unit 220), with F2$e$=F2$pe$+F1$e$+Fae. Preferably, the flow F2$pe$ of the second-dimension fluid drive 206 is reduced such that the flow rate F2$e$ into the second dimension is kept substantially at the same level as during the withdrawing phase of step A, such that F2$e$ substantially equals F2$i$.

The flow Fae does not have to equal with Fai, neither with respect to flow rate nor to the total fluid volume provided in each respective phase of ejection and withdraw. Direction of the flow Fae is opposite to the flow Fai.

In a preferred embodiment, the operation during the ejection phase of step B is provided at constant pressure (i.e. the sample separation apparatus 200 is controlled, e.g. by the data processing unit 70, in a way that the pressure between the first-dimension outlet 270 and the second-dimension inlet 272 is kept substantially constant, thus providing stable and reproducible pressure conditions at the first-dimension outlet 270). If the second-dimension fluid drive 206 is operated in constant pressure mode, the flow F2$pe$ is preferably adjusted automatically by the fluid drive 206. Further or alternatively, operation during the ejection phase may be provided as volume-based operation as explained above, so that operation is controlled based on fluid volume flows.

During the ejection phase of step B, the aliquot (comprising the content provided by the modulation unit 220 at flow rate Fae and the first-dimension effluent at flow rate F1$e$) will become diluted by the flow F2$pe$ provided by the second-dimension fluid drive 206 corresponding to the ratio (F1$e$+Fae)/F2$pe$. Accordingly, the combination or relation between the F2$pe$ and Fae can be adjusted according to the dilution ratio as being required or desired during the ejection phase. If no dilution is required or desired, F2$pe$ may even be selected to be zero.

Generally speaking, the flow rate F1 (i.e. F1$i$ and F1$e$, respectively) is preferably selected to be smaller (and preferably significantly smaller) than the flow rate F2 (i.e. F2$i$ and F2$e$, respectively). In a so-called comprehensive mode, F2 is selected to be significantly higher than F1 in order to allow an efficient, full and complete separation within the second dimension of all sample provided from the first dimension. In contrast to the aforementioned WO2013167193A1, wherein the flow into the second dimension is always the sum of flows provided by the first-dimension pump and the second-dimension pump, the flow F2 into the second dimension according to embodiments of the present invention is modulated by the flows Fa (i.e. Fai and Fae, respectively) as provided by the modulation unit 220. Preferably the flow rates F1$i$ and F1$e$ are the same or at least controlled by the same mechanism, as e.g. constant pressure control imposed to the 1st liquid drive 202, and are not affected by the modulation.

The simultaneous introduction of sample flow Fae (from the modulation unit 220) and of sample flow F1$e$ (from the first-dimension outlet 270) into the second-dimension inlet 272 is preferably controlled so that sample focusing of the entire sample occurs at an inlet of the second-dimension separation unit 208 (such as a column head of a chromatographic column). Sample focusing means that substantially all analytes or at least the analytes of interest contained in the sample fluid are trapped in the head or inlet section of the second-dimension separation unit 208, e.g. resulting from a flow of weak solvent as mobile phase during the sample focusing. By applying a gradient, e.g. as a variation over time of the mobile phase from a weak solvent to a strong solvent, the trapped sample components (analytes) will eventually propagate through the second-dimension separation unit 208 and be separated in individual fractions thereby.

The three parameters of pressure (between the first-column outlet 270 and the second-dimension inlet 272), dilution (($F1e$+Fae)/$F2pe$), and duration of the ejection phase are dependent on each other to a certain degree and can be controlled during the ejection phase. Simultaneously controlling pressure and dilution requires a variation in the duration of the ejection phase, which, however, is often not desired in certain applications as a variation in the duration of the ejection phase may lead to a variation in the total sample volume ($F1e$+Fae)×duration introduced into the second dimension during the ejection phase due to the continuous flow of $F1e$ (which preferably cannot be controlled e.g. by the modulation unit 220). In a preferred embodiment, the duration of the ejection phase is kept constant (for a respective separation task), the pressure is controlled to be substantially constant, and dilution ratio may be affected in a certain range resulting from the control of the ejection phase duration pressure and the flow rate provided by the second fluid drive 206 needed to maintain the desired or commanded pressure level in pressure controlled operation mode.

After introduction of the total sample volume determined by the total sample flow rate ($F1e$+Fae) and the duration of the ejection phase (determined in turn by the volume stored in the modulation unit 220 or predestinated to injection from the modulation unit 220) into the second dimension during the ejection phase, further separation of such introduced sample in the second dimension will occur after switching into a successive withdrawing phase, wherein the flow $F2a$ from the second-dimension fluid drive 206 into the second-dimension inlet 272 will drive such introduced sample through the second-dimension separation unit 208. As previously explained, the second-dimension fluid drive 206 may preferably operate in a gradient mode in order to provide a variation in solvent composition over time, preferably by gradually varying from a weak mobile phase to a strong mobile phase.

Duration of the ejection phase is preferably controlled or selected to be smaller and preferably significantly smaller than duration of the withdrawing phase, in order to allow adequate time required for the second-dimension separation e.g. to ensure a so-called comprehensive mode. Accordingly, the flow rate of Fae is preferably controlled or selected to be greater and preferably significantly greater than the flow rate of Fai. With Fai being equal or at least substantially equal to $F1i$, and Fae being smaller or equal to $F2e$, the maximum flow Fae is smaller or equal to $F2pe$. Accordingly, $F2pe \gg F1e$ and also $F2pi \gg F1i$, thus substantially making the basic constraints to the flow rates relations similar to those in the aforementioned tandem-LC system of WO2013167193A1.

In the examples of FIGS. 6, the modulation unit 220 is depicted as a syringe-type pump. Preferably, such syringe-type pump is implemented with a low dead volume (and preferably zero dead volume). An alternative or additional design, which provides a greater ejection volume than the foregoing sample intake volume was, may be used for the modulation unit 220 in order to reduce or even avoid sample carryover, i.e. smearing of sample from one sampling cycle to another. Accordingly, the fluid volume ejected by the modulation unit 220 during step B is preferably selected to be equal to or larger than the fluid volume withdrawn during step A by the modulation unit 220.

FIGS. 7A and 7B schematically illustrate another preferred embodiment of the modulation unit 220 within the sample separation apparatus 200. The principle of operation is substantially the same as described in above FIGS. 6A and 6B for the embodiment of the modulation syringe as the modulation unit 220, with FIG. 7A depicting the withdrawing phase of step A and FIG. 7B depicting the ejection phase of step B. The difference is that the sample (from the first dimension is withdrawn from the first coupling point 210) can be stored in a reservoir 700 (such as a loop capillary or any other adequate reservoir allowing to temporarily store an amount of fluid). A modulation pump 710, which can be the modulation syringe of the embodiment of FIG. 6 or for example a reciprocating pump, is coupling to the reservoir 700.

The modulation pump 710 can further be extended by an additional pump or pump arrangement 720 allowing to feed additional liquid volume into the modulation unit 220 independent of the aliquot pathway (as branched from the first coupling point 210). Such embodiment allows to eject excessive fluid volume (as compared to the aliquot volume withdrawn from the first coupling point 210), thus enabling to avoid aliquot smearing (of sample carryover) even when using conventional piston pumps by providing a certain flush-out volume after ejection of each aliquot.

During the aliquot sampling phase (i.e. the withdrawing phase of step A), the aliquot is drawn into the reservoir 700 by the modulation pump 710, whereas the additional pump 720 may be intaking a displacement solvent e.g. from an external reservoir 750. These considerations do not basically affect the flow rate considerations as above, only adding some excessive flow rate during the ejection phase. It is advantageous to keep the additional or excessive flush volume as low as possible, e.g. at the level of nearly or less than the aliquot volume, particularly at the level of 0.5 times the aliquot volume more particularly more at the level of 0.2 times the aliquot volume or even less. Corresponding geometry (e.g. coiled, knitted or curved) of the reservoir capillary 700, which can be a planar or microfluidic device as well as conventional capillary, may support efficient flush out of the stored sample with minimum extra flush volume.

One or more valves, e.g. unidirectional check valves 730 and 740 in the embodiment of FIG. 7, can be employed to ensure flow direction in the respective phases of step A and B.

The modulation unit 220 in FIG. 7 can be implemented e.g. as a dual-piston pump, a one-and-a-half piston pump, or as a step-piston single-cylinder pump as depicted in FIG. 8.

The direction of piston movement (different from the conventional operation of the aforementioned pump types) within the modulation unit 220 is exemplarily illustrated in FIGS. 7A and 7B. In the withdrawing phase shown in FIG. 7A, the pistons of both the modulation pump 710 and the additional pump 720 are moving downwards (as indicated by the arrows), so that the modulation pump 710 withdraws fluid from the first coupling point 210 into the reservoir 700, and the additional pump 720 sucks in fluid from the external reservoir 750. In the ejection phase shown in FIG. 7B, the pistons of both the modulation pump 710 and the additional pump 720 are moving upwards (i.e. in opposite direction as in FIG. 7A), so that the modulation pump 710 ejects the content of the reservoir 700 (or parts thereof) into the first coupling point 210, while the additional pump 720 supplies fluid towards and into the modulation pump 710. It is clear that dependent on the pump setting and mode of operation, the additional pump 720 may also supply fluid towards the reservoir 700 and accordingly into the first coupling point 210.

In the embodiment of FIG. 7B, sample stored in the reservoir 700 is ejected (into the first coupling point 210) by piston movement of the modulation pump 710, while the additional pump 720 adds certain flow on top such that the total displaced volume exceeds the intake aliquot. Thus, any possible carryover or memory effect due to sample smearing in the reservoir 700 or incomplete displacement out of the reservoir 700 can be prevented.

It is noted that in exemplary embodiments of the FIGS. 6A-6B and 7A-7B, the modulation assembly 90 can be understood as covering all components coupled between the first-dimension outlet 270 and the second-dimension inlet 272.

FIG. 8 shows an embodiment of the modulation unit 220 as a two-stage step-piston pump 800. The reservoir 700 (as shown in FIG. 7) may be additionally coupled between pump 800 and the first coupling point 210.

It is clear that any controlled high-pressure liquid source capable of receiving an at least limited liquid volume from the high-pressure line, i.e. in backwards direction, can be used as embodiment for the modulation unit 220, either alone or in combination with the reservoir 700, which may be coupled between such modulation unit 220 and the first coupling point 210. As an example, one of the drives or high-pressure cylinders as employed in the second-dimension fluid drive 206 may serve for that purpose.

It is also clear that the flow of fluid can be primarily or additionally controlled by aid of one or more flow sensors, preferably for flow direction control in the connection between the branchings of the conduit between the first-dimension separation unit 204 and the second-dimension separation unit 208, such as the branchings provided by the first coupling point 210 and/or the second coupling point 230.

FIG. 9 depicts an embodiment of the flow path between the first-dimension outlet 270 and the second-dimension inlet 272, wherein the first coupling point 210 and the second coupling point 230 are substantially falling together. The first coupling point 210 is configured that the entire flow from the first-dimension output 270 is withdrawn by and into the modulation unit 220 (not shown in FIG. 9), when the modulation unit 220 is withdrawing at the same or higher flow rate than a delivery rate from the first-dimension output 270. Accordingly, no portion of such flow from the first-dimension output 270 can bypass the "suction point" and continue movement towards the second-dimension. This means that no flow line is existent for the first-dimension flow (outcoming from the first-dimension outlet 270), which would lead to the second-dimension inlet 272 unless the withdraw flow rate is less than the first-dimension flow rate. In other words, no portion of the first-dimension flow provided via the first-dimension outlet 270 may get to the inlet of the 2nd dimension unless the draw flow rate is less than first-dimension flow rate or less than a threshold draw flow rate securely preventing such break-through flow. Reference numeral 900 represents a boundary surface separating the areas of first- and second-dimension flow transport to satisfy these requirements, thus representing a junction comprising the first coupling point 210 and the second coupling point 230, having a boundary surface which completely separates flow from the first-dimension outlet 270 and the second-dimension inlet 272, and which is not permeated by any flow line towards the second-dimension inlet 272 when the modulation unit 220 is drawing at the same or higher flow rate as the delivery rate of the first dimension (i.e. at any point of which the normal flow rate is zero).

Further embodiments are briefly illustrated in FIGS. 10-12, which correspond to the aforedescribed embodiments in FIGS. 6-7. In FIGS. 10-12, the modulation unit 220 comprises a plurality of sample reservoirs 700, indicated as reference numeral 1000, thus enabling "multiple heart cutting" and "high resolution sampling" operation. "Multiple heart cutting" operation mode can be understood as taking a number of aliquots from multiple not adjacent regions of a chromatogram, i.e. taking samples of the first-dimension effluent at different not adjacent time points or intervals during a first-dimension separation. "High resolution sampling" operation mode can be understood as taking a series of adjacent aliquots during an uninterrupted time interval within a first-dimension chromatogram.

Content of each of the sample reservoirs 700 can be ejected and then separated in a similar mode as in aforedescribed embodiments. Implementing a plurality of reservoirs 700 as shown in the FIGS. 10, 11, 12 allows for taking multiple or at least additional separate samples while a separation in the second dimension is still in run. In order to operate a plurality of sample reservoirs 700, the draw and ejection flow for these can be controlled or operated by multiple modulation devices 1100 (indicated in FIGS. 10 and 12), connected altogether to the second coupling point 230. The individual draw and eject operations for the reservoirs 1000 can then be controlled by individual actuation of the corresponding modulation devices 1100. Alternatively, the sample fractions can be drawn into multiple syringes or sample reservoirs dispatched by a corresponding selection valve (FIGS. 10-11). The plurality of modulation devices 1100 or syringes can be operated by separate drives or by a single drive enabling sequential actuation of the said syringes.

It should be noted that the term "comprising" does not exclude other elements or features and the term "a" or "an" does not exclude a plurality. Also, elements described in association with different embodiments may be combined. It should also be noted that reference signs in the claims shall not be construed as limiting the scope of the claims.

The invention claimed is:

1. A sample separation apparatus for separating a fluidic sample, the sample separation apparatus comprising:
   a first-dimension separation unit for separating the fluidic sample, wherein the first-dimension separation unit comprises a first-dimension outlet for outputting the fluidic sample or fractions thereof after treatment by the first-dimension separation unit;
   a second-dimension separation unit for further separating the fluidic sample or fractions thereof after treatment by the first-dimension separation unit, wherein the second-dimension separation unit comprises a second-dimension inlet fluidically coupled to the first-dimension outlet;
   a modulation unit fluidically coupled between the first-dimension outlet and the second-dimension inlet at a first coupling point, wherein the modulation unit is configured to withdraw fluid from the first coupling point and to eject fluid into the first coupling point; and
   a second-dimension fluid drive fluidically coupled to a second coupling point between the first-dimension outlet and the second-dimension inlet, wherein the second coupling point is located downstream from the first coupling point, and the second-dimension fluid drive is configured to generate a fluid flow for driving at least part of the fluidic sample after treatment by the first-dimension separation unit through the second-dimension separation unit, wherein the first-dimension separation unit is fluidically coupled to the second-dimension separation unit via the first coupling point and the second coupling point, with the first coupling point and the second coupling point each comprising three fluid terminals and providing a permanent fluid communication between the three fluid terminals.

2. The sample separation apparatus of claim 1, wherein the fluidic coupling of the second-dimension inlet to the first-dimension outlet is at least one selected from the group consisting of: a permanent fluidic coupling; a direct fluidic communication; a passive fluidic communication; a fluidic conduit; a fluidic connection enabling essentially unconstrained liquid flow at least in the direction from the first-dimension outlet towards or to the second-dimension inlet; and a fluidic connection enabling essentially the same pressure in the fluid flow path between the first-dimension outlet and the second-dimension inlet.

3. The sample separation apparatus of claim 1, comprising at least one of:

the modulation unit is configured for withdrawing from the first coupling point at least such amount of fluid as received from the first-dimension outlet;

the modulation unit is configured for withdrawing from the first coupling point at least such amount of fluid as received from the first-dimension outlet, and for withdrawing further an amount of the fluid provided into the second coupling point by the second-dimension fluid drive;

the modulation unit is configured for ejecting into the first coupling point at least a part of the fluid withdrawn from the first coupling point;

the modulation unit comprises a fluid reservoir configured for storing a fluid volume, wherein the modulation unit is configured to eject an amount of the fluid volume stored in the fluid reservoir into the first coupling point;

the modulation unit comprises a pump, wherein the pump comprises at least one selected from the group consisting of: a syringe pump; a piston pump; a reciprocating piston pump; a dual pump comprising two piston pumps connected in parallel or serial to each other; a multi-stage step-piston pump having a single piston with at least two sections of different diameters; and a modulation pump capable of intaking and ejecting at least a limited amount of fluid via the same connection port/conduit;

the modulation unit comprises a pump and a fluid reservoir, wherein the fluid reservoir is coupled between the pump and the first coupling point, and the fluid reservoir is configured for storing an amount of fluid as withdrawn by the pump from the first coupling point.

4. The sample separation apparatus of claim 1, comprising a first-dimension fluid drive configured for generating a fluid flow for driving the fluidic sample to be separated through the first-dimension separation unit.

5. The sample separation apparatus of claim 1, wherein the sample separation apparatus is configured for adjusting a pressure at a predefined position to a predefined value, and wherein the predefined position is in a fluidic path between the first-dimension outlet and the second-dimension inlet or in fluid communication with this fluidic path.

6. The sample separation apparatus of claim 5, comprising at least one of:

the predefined position is in one of the following: a section between the first-dimension output and the first coupling point; a section between the first coupling point and the second coupling point; a section between the second coupling point and the second-dimension input;

the sample separation apparatus is configured for adjusting the pressure at the predefined position to a constant value;

the second-dimension fluid drive is controllable for adjusting the pressure at the predefined position to the predefined value;

the second-dimension fluid drive is controllable for adjusting the pressure at the predefined position to follow a predefined course;

the second-dimension fluid drive is controllable for adjusting a flow rate at the predefined position to a previously calibrated value;

a first-dimension fluid drive configured for generating a fluid flow for driving the fluidic sample to be separated through the first-dimension separation unit, wherein at least one of the first-dimension fluid drive, the second-dimension fluid drive and the modulation unit is controllable for adjusting a ratio between a flow rate at the predefined position and a flow rate generated by the first-dimension fluid drive to a predefined value;

a flow rate generated by the second-dimension fluid drive is controllable for adjusting the pressure at the predefined position to the predefined value;

the sample separation apparatus is configured for regulating the pressure at the predefined position to the predefined value based on sensor data acquired in the fluidic path and indicative of an actual pressure value at the predefined position;

the sample separation apparatus is configured for adjusting the pressure to the predefined value in the entire fluidic path between the first-dimension separation unit, the second-dimension fluid drive and the second-dimension separation unit.

7. The sample separation apparatus of claim 1, comprising at least one of:

the sample separation apparatus is configured for operation in accordance with a volume-based control scheme, wherein the sample separation apparatus is configured for executing sample separation by controlling run volumes of fluid flowing over at least one of the separation units whereas evaluation of the sample separation is performed in terms of retention volumes required for releasing fractions of the fluidic sample from at least one of the separation units;

the sample separation apparatus is configured for separating the fluidic sample by modifying a flow rate through at least one of the first-dimension fluid drive, the second-dimension fluid drive and the modulation unit;

the sample separation apparatus is configured for temporarily withdrawing, from a flow path from the first-dimension outlet to the second-dimension inlet, a fraction of fluidic sample by modifying a flow rate through at least one of the first-dimension fluid drive, the second-dimension fluid drive, and the modulation unit;

the sample separation apparatus is configured for ejecting a temporarily withdrawn fraction of fluidic sample into a flow path, from the first-dimension outlet to the second-dimension inlet, by modifying a flow rate through at least one of the first-dimension fluid drive, the second-dimension fluid drive, and the modulation unit;
at least one of the first coupling point and the second coupling point is configured as one of: a fluidic T-piece; a fluidic Y-piece; a fluidic X-piece;
at least one of the first-dimension fluid drive and the second-dimension fluid drive is a fluid gradient pump.

8. The sample separation apparatus of claim 1, comprising at least one of:
a detector for detecting the separated fluidic sample and arranged downstream of the second-dimension separation unit;
a sample injector for injecting the fluidic sample into a mobile phase and arranged between a first-dimension fluid drive and the first-dimension separation unit;
a first-dimension fluid drive configured for generating a fluid flow for driving the fluidic sample to be separated through the first-dimension separation unit, wherein the first-dimension fluid drive is operable with a first-dimension flow rate being smaller than a second-dimension flow rate according to which the second-dimension fluid drive is operable.

9. The sample separation apparatus of claim 1, comprising a control device configured for:
controlling the first-dimension separation unit to execute a first-dimension separation within a measurement volume interval for separating the fluidic sample into a plurality of fractions; and
controlling the second-dimension separation unit to execute a sequence of second-dimension separations within the measurement volume interval for further separating at least a part of the plurality of separated fractions.

10. The sample separation apparatus of claim 1, comprising at least one of the following features:
the sample separation apparatus comprises a control device configured for controlling operation of at least one of the first-dimension fluid drive or the second-dimension fluid drive;
at least one of the first-dimension separation unit or the second-dimension separation unit is configured for performing a separation in accordance with one selected from the group consisting of: liquid chromatography; supercritical-fluid chromatography capillary electrochromatography; electrophoresis; and gas chromatography;
the sample separation apparatus is configured as a two-dimensional liquid chromatography sample separation apparatus;
the sample separation apparatus is configured to analyze at least one physical, chemical and/or biological parameter of at least one compound of the fluidic sample;
the sample separation apparatus comprises at least one selected from the group consisting of: a chromatography device a liquid chromatography device; an HPLC device a gas chromatography device; a capillary electrochromatography device; an electrophoresis device; a capillary electrophoresis device; a gel electrophoresis device; and a mass spectroscopy device;
the sample separation apparatus is configured for generating a fluid flow for conducting the fluidic sample with a high pressure;
the sample separation apparatus is configured for generating a fluid flow for conducting the fluidic sample with a pressure of at least 100 bar;
the sample separation apparatus is configured to conduct a liquid fluid;
the sample separation apparatus is configured as a microfluidic device;
the sample separation apparatus is configured as a nanofluidic device;
at least one of the first-dimension separation unit or the second-dimension separation unit is configured for retaining at least a part of components of the fluidic sample and for allowing other components of the fluidic sample to pass;
at least one of the first-dimension separation unit or the second-dimension separation unit comprises a separation column;
at least one of the first-dimension separation unit or the second-dimension separation unit comprises a chromatographic column;
at least a part of at least one of the first-dimension separation unit or the second-dimension separation unit is filled with a separating material.

11. A method for separating a fluidic sample, the method comprising:
separating, in a first-dimension separation unit, the fluidic sample and outputting the fluidic sample or fractions thereof after treatment by the first-dimension separation unit;
fluidically coupling at a first coupling point, downstream from the first-dimension separation unit, for one of: withdrawing fluid from the first coupling point during a withdrawing phase, and ejecting fluid into the first coupling point during an ejection phase; and
generating a fluid flow into a second coupling point, downstream from the first coupling point, for further separating, in a second-dimension separation unit, the fluidic sample or fractions thereof after treatment by the first-dimension separation unit, wherein the first-dimension separation unit is fluidically coupled to the second-dimension separation unit via the first coupling point and the second coupling point, with the first coupling point and the second coupling point each comprising three fluid terminals and providing a permanent fluid communication between the three fluid terminals.

12. The method of claim 11, comprising at least one of:
during the withdrawing phase, withdrawing from the first coupling point at least such amount of fluid as received from the first-dimension separation unit;
during the withdrawing phase, withdrawing from the first coupling point an amount of the fluid coupled into the second coupling point;
during the ejection phase, ejecting into the first coupling point at least a part of the fluid withdrawn during the withdrawing phase from the first coupling point;
during the ejection phase, ejecting into the first coupling point an additional amount of fluid for at least one of diluting the fluid previously withdrawn from the first coupling point and purging any fluid previously withdrawn from the first coupling point.

13. The method of claim 11, further comprising adjusting a pressure at a predefined position to a predefined value, wherein the predefined position is in a fluidic path between the first-dimension separation unit and the second-dimension separation unit.

14. A non-transitory computer-readable medium with instructions stored thereon, that when executed by a processor, control the steps of the method of claim 11.

15. The sample separation apparatus of claim 1, wherein the modulation unit comprises a pump.

16. The sample separation apparatus of claim 15, comprising a first-dimension fluid drive configured for generating a fluid flow for driving the fluidic sample to be separated through the first-dimension separation unit.

17. The method of claim 11, wherein the withdrawing of fluid from the first coupling point during the withdrawing phase comprises operating a pump of a modulation unit fluidically coupled between a first-dimension outlet of the first-dimension separation unit and a second-dimension inlet of the second-dimension separation unit at the first coupling point.

18. The method of claim 17, comprising:
operating a first-dimension fluid drive to drive the fluidic sample to be separated through the first-dimension separation unit; and
operating a second-dimension fluid drive to drive the fluidic sample or fractions thereof to be further separated through the second-dimension separation unit.

19. The sample separation apparatus of claim 1, wherein the modulation unit is configured to withdraw the fluid from the first coupling point by pulling the fluid from the first coupling point.

20. The method of claim 11, wherein the withdrawing of fluid from the first coupling point during the withdrawing phase comprises pulling the fluid from the first coupling point.

* * * * *